US010021220B2

(12) United States Patent
George et al.

(10) Patent No.: US 10,021,220 B2
(45) Date of Patent: Jul. 10, 2018

(54) OBJECT AMALGAMATION BASED ON CATEGORIZATION AND PROTOCOL GRANULARIZATION

(71) Applicant: Adobe Systems Incorporated, San Jose, CA (US)

(72) Inventors: William Brandon George, Pleasant Grove, UT (US); Kevin Gary Smith, Lehi, UT (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 264 days.

(21) Appl. No.: 14/930,390

(22) Filed: Nov. 2, 2015

(65) Prior Publication Data
US 2017/0126848 A1    May 4, 2017

(51) Int. Cl.
*H04L 29/06*    (2006.01)
*H04L 29/08*    (2006.01)

(52) U.S. Cl.
CPC ............ *H04L 69/18* (2013.01); *H04L 67/125* (2013.01); *H04L 69/24* (2013.01)

(58) Field of Classification Search
CPC ....................................................... H04L 69/18
USPC .......................................................... 709/230
See application file for complete search history.

(56) References Cited

U.S. PATENT DOCUMENTS

| | | | | |
|---|---|---|---|---|
| 6,061,690 | A * | 5/2000 | Nori ................... | G06F 17/30315 |
| 6,085,193 | A * | 7/2000 | Malkin ............. | G06F 17/30902 |
| 6,256,675 | B1 * | 7/2001 | Rabinovich ............. | H04L 29/06 |
| | | | | 709/225 |
| 6,950,791 | B1 * | 9/2005 | Bray ................. | G06F 17/30241 |
| | | | | 345/420 |
| 7,212,543 | B1 * | 5/2007 | Arwald ................... | H04M 7/12 |
| | | | | 370/466 |
| 7,243,107 | B2 * | 7/2007 | Ghandour ......... | G06F 17/30011 |
| | | | | 707/959 |

(Continued)

OTHER PUBLICATIONS

Al-Fuqaha et al., "Internet of Things: A Survey on Enabling Technologies, Protocols, and Applications", 2015.*

(Continued)

*Primary Examiner* — O. C. Vostal
(74) *Attorney, Agent, or Firm* — Wolfe-SBMC

(57) ABSTRACT

Object amalgamation based on categorization and protocol granularization is described. For certain example embodiments, each object belongs to a category of objects that is associated with a particular protocol. A protocol may include a wireless communication protocol and/or a characteristic description protocol. The object is capable of communicating a characteristic in accordance with the corresponding particular protocol. The characteristic may be an intrinsic attribute or a sensed value. A coordinator object groups other objects so as to amalgamate them into subnetworks in which the member objects are empowered to communicate with each other. If two objects correspond to different protocols, another object may translate a wireless communication from one protocol to another protocol. A coordinator object amalgamates characteristics received from other objects into a combined characteristic entity that may be used to jointly analyze the characteristics locally and produce a report for an end user based on the amalgamated characteristics.

20 Claims, 13 Drawing Sheets

(56) References Cited

U.S. PATENT DOCUMENTS

| | | | | |
|---|---|---|---|---|
| 7,249,183 | B1* | 7/2007 | Subbiah | G06F 13/387 709/227 |
| 7,290,061 | B2* | 10/2007 | Lentini | G06F 17/3089 709/227 |
| 7,792,981 | B2* | 9/2010 | Taylor | H04L 29/06 370/466 |
| 8,495,072 | B1* | 7/2013 | Kapoor | H04W 12/02 707/754 |
| 9,038,128 | B2* | 5/2015 | Walsh | G06F 9/455 713/166 |
| 9,055,000 | B1* | 6/2015 | Ghosh | H04L 45/66 |
| 9,606,817 | B1* | 3/2017 | Efstathopoulos | G06F 9/455 |
| 2002/0099562 | A1* | 7/2002 | Bruce, Sr. | G06Q 30/06 705/26.1 |
| 2003/0123465 | A1* | 7/2003 | Donahue | H04L 45/02 370/401 |
| 2005/0007238 | A1* | 1/2005 | Hartmann | G06K 7/0008 340/10.2 |
| 2005/0066020 | A1* | 3/2005 | Wechter | H04L 41/0213 709/223 |
| 2005/0198336 | A1* | 9/2005 | Eytchison | H04L 69/08 709/230 |
| 2006/0075141 | A1* | 4/2006 | Boxenhorn | G06F 9/5038 709/246 |
| 2006/0098814 | A1* | 5/2006 | Al-Khoraidly | G06F 7/725 380/28 |
| 2006/0271698 | A1* | 11/2006 | Shrader | G06Q 10/10 709/230 |
| 2007/0250590 | A1* | 10/2007 | Flannery | H04L 12/66 709/217 |
| 2008/0005689 | A1* | 1/2008 | Evernden | G06F 8/24 715/765 |
| 2008/0104087 | A1* | 5/2008 | Rowley | H04L 61/1523 |
| 2009/0240695 | A1* | 9/2009 | Angell | G06F 17/30781 |
| 2009/0300419 | A1* | 12/2009 | Silverman | G06F 11/2294 714/30 |
| 2012/0023546 | A1* | 1/2012 | Kartha | H04L 63/104 726/1 |
| 2013/0044882 | A1* | 2/2013 | Rich | H04L 9/0833 380/279 |
| 2013/0086245 | A1* | 4/2013 | Lu | G05B 13/02 709/223 |
| 2013/0227114 | A1* | 8/2013 | Vasseur | H04L 41/044 709/224 |
| 2015/0156266 | A1* | 6/2015 | Gupta | H04L 67/12 709/224 |
| 2015/0249672 | A1* | 9/2015 | Burns | H04L 12/66 726/4 |
| 2015/0351145 | A1* | 12/2015 | Burks | G08C 17/02 455/41.3 |
| 2015/0365278 | A1* | 12/2015 | Chakrabarti | H04L 41/0806 370/254 |
| 2016/0006673 | A1* | 1/2016 | Thomas | G06F 9/544 709/226 |
| 2016/0064938 | A1* | 3/2016 | Balasubramanian | H04L 12/10 307/11 |
| 2016/0088049 | A1* | 3/2016 | Seed | G06F 9/541 709/203 |
| 2016/0128043 | A1* | 5/2016 | Shuman | H04W 72/044 370/331 |
| 2016/0135241 | A1* | 5/2016 | Gujral | H04W 4/70 370/328 |
| 2016/0234628 | A1* | 8/2016 | Rahman | H04L 12/2809 |
| 2016/0285671 | A1* | 9/2016 | Rangarajan | H04L 67/327 |
| 2016/0358459 | A1* | 12/2016 | Singhar | G08C 17/02 |
| 2016/0366123 | A1* | 12/2016 | Smith | H04L 61/1511 |
| 2017/0006479 | A1* | 1/2017 | Smith | H04W 24/02 |
| 2017/0046366 | A1* | 2/2017 | Rahman | G06F 17/30864 |
| 2017/0222877 | A1* | 8/2017 | Sagot | H04L 41/0816 709/223 |
| 2018/0091391 | A1* | 3/2018 | Turow | G06F 17/30345 |

OTHER PUBLICATIONS

Brama et al., "An Inter-Device COmmunication Protocol for Modular Smart-Objects", 2014.*
Deak et al., "IoTs (INternet of Things) and DfPL (Device-free Passive Localisation) in a disaster management scenario", 2013.*
Ericsson et al., "Protocol Analysis", 1981.*
Gazis et al., "A Survey of Technologies for the Internet of Things", 2015.*
IEEE, "Towards a definition of the Internet of Things (IoT)", 2015.*
Lee et al., "Internet of Things", 2013.*
Salman et al., "Networking Protocols and Standards for Internet of Things", 2015.*
Sheng et al., "A Survey on the IETF Protocol Suite for the Internet of Things: Standards, Challenges, and Opportunities", 2013.*
Sheng et al., "Surfing the Internet-of-Things: Lightweigth Access and Control of Wireless Sensor Networks Using Industrial Lower Power Protocols", 2014.*
Sohrabi et al., "Protocols for Self-Organization of a Wireless Sensor Network", 2000.*
Zhong et al., "Study on the IOT Architecture and Gateway Technology", 2015.*
Zhu et al., "IOT Gateway: Bridging Wireless Sensor Networks into Internet of Things", 2010.*
Merriam-Webster, "amalgam", 2017.*
Akkaya et al., "A survey on routing protocols for wireless sensor networks", 2003.*
Farhadi et al., "Describing Objects by their Attributes", 2009.*
Heikkila et al., "Description of interest regions with local binary patterns", 2008.*
Merriam-Webster, "amalgamate", 2017.*
Barry,"Direct-to-device connectivity in the Internet of Things", Real Time Engineers, Ltd. Retrieved from <http://www.embedded.com/design/real-world-applications/4426949/Direct-to-device-connectivity-in-the-Internet-of-Things#> on Jul. 20, 2015, Jan. 12, 2014, 5 pages.

* cited by examiner

OBJECT AMALGAMATION BASED ON CATEGORIZATION AND PROTOCOL GRANULARIZATION

BACKGROUND

The Internet of Things holds great promise for bringing people a richer, more-connected world. For example, machines can report a malfunction and request service, a consumable item can announce when a replacement needs to be purchased, and so forth. Two technological developments have paved the way for the Internet of Things. First, the number of available Internet addresses has dramatically increased with the adoption of Internet Protocol version 6 (IPv6). IPv6 is the latest protocol defining how electronic devices identify, locate, and communicate with other electronic devices on the Internet. With IPv6, there are now enough Internet addresses to assign each item manufactured by humans an individual unique Internet address. Second, the seemingly inexorable reduction in size and cost of electronic circuitry continues. Computer processing circuits, memory chips, wireless communication units, sensors, etc. have become sufficiently small and inexpensive to enable deployment with many different kinds of products, including consumable and disposable ones.

One of the asserted benefits of the Internet of Things is that the products that people use every day can be in communication with the cloud. A given product can access a manufacturer's servers for diagnostic help or can contact a retailer's website to place a reorder. This ability with the Internet of Things to communicate directly with the cloud enables individual products to have access to a wealth of information and commerce opportunities.

To facilitate communication between products and the cloud, a standardized protocol may be adopted for the Internet of Things. Each product is enabled to communicate through a standard protocol to reduce the complexity of Internet of Things objects and to simplify an exchange of information. This approach, although providing a streamlined design and production process for Internet of Things objects, implicitly limits some of the potential capabilities of a richer, more-connected world.

SUMMARY

Object amalgamation based on categorization and protocol granularization is described. In one or more example embodiments, different objects wirelessly communicate using different protocols that depend on a category to which an individual object belongs. Sporting equipment and food, for instance, may belong to different categories that are associated with different protocols. A given protocol can therefore be tailored to differing features and varying characteristics across different categories of objects. A protocol may pertain to a wireless communication protocol that relates to an air interface or similar networking aspects. Alternatively, a protocol may pertain to a characteristic description protocol that relates to more personal aspects of an individual object, such as intrinsic or sensed characteristics.

More specifically, an object may be associated with multiple characteristics, such as an attribute or a sensed value. An attribute represents an intrinsic quality or aspect that is unlikely to change over time. A sensed value, on the other hand, may be transient and represents some aspect of the object or the object's environment that is detected by an onboard sensor of the object. A protocol corresponding to a given object may be tailored to express characteristics of the given object that are relevant based on a category to which the given object belongs.

To facilitate sharing and utilization of object characteristics, subnetworks of objects may be formed. A subnetwork may be formed by amalgamating objects that correspond to a same protocol. Because the objects belong to a same category and the protocol is appropriately tailored to the category, the objects in the subnetwork may be empowered to share characteristic information across a full range of features of the objects. With a subnetwork formed from objects belonging to a same category, an object of the subnetwork may produce a combined characteristic entity that is usable to jointly analyze multiple characteristics that are amalgamated across multiple objects of the subnetwork. Alternatively, multiple objects that correspond to different protocols may be amalgamated into a single subnetwork using, for example, a coordinator object that is capable of translating wireless communications between different protocols.

In one or more example embodiments, an object coordination module is implemented at least partially in hardware of a device to perform a number of operations. A first indication of a first category to which a first object belongs is obtained. The object coordination module determines a first protocol that corresponds to the first object based on the first indication of the first category. A second indication of a second category to which a second object belongs is obtained. The object coordination module determines a second protocol that corresponds to the second object based on the second indication of the second category. The object coordination module further causes at least one subnetwork to be formed with the first object and the second object responsive respectively to the first protocol and the second protocol.

In one or more example embodiments, a networking unit is implemented at least partially in hardware of an apparatus to perform multiple operations. Multiple wireless communications from multiple objects are received. The networking unit determines which protocols of multiple protocols correspond to the multiple wireless communications that are received from the multiple objects and associates individual ones of the multiple objects with a protocol of the multiple protocols based on the determination. The networking unit also forms a subnetwork with a subset of the multiple objects. The subnetwork formation includes selecting at least one particular protocol from the multiple protocols and adding an object of the multiple objects to the subnetwork if the object corresponds to the at least one particular protocol. The networking unit further coordinates wireless communications between or among the objects added to the subnetwork to facilitate a functionality enabled by amalgamating characteristics provided by the objects of the subnetwork.

In one or more example embodiments, a method is implemented in a digital environment to amalgamate object functionality by coordinating communication of object characteristics. The method includes establishing a wireless link with a first object that wirelessly communicates using a first protocol, with the first object belonging to a first category of objects. The method also includes establishing a wireless link with a second object that wirelessly communicates using a second protocol, with the second object belonging to a second category of objects. The method further includes receiving a first wireless communication from the first object, with the first wireless communication corresponding to the first protocol. The method still further includes translating the first wireless communication that corresponds to the first protocol to a second wireless communication that corresponds to the second protocol. After the translating, the second wireless communication is transmitted to the second object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures. In the figures, the left-most digit or two digits of a reference number identifies the figure in which the reference number first appears. The use of the same reference numbers in different instances in the description and the figures may indicate similar or identical items. Items represented in the figures may be indicative of one or more items, and thus reference may be made interchangeably to single or plural forms of the items in the discussion.

DETAILED DESCRIPTION

Overview

Figure 1:
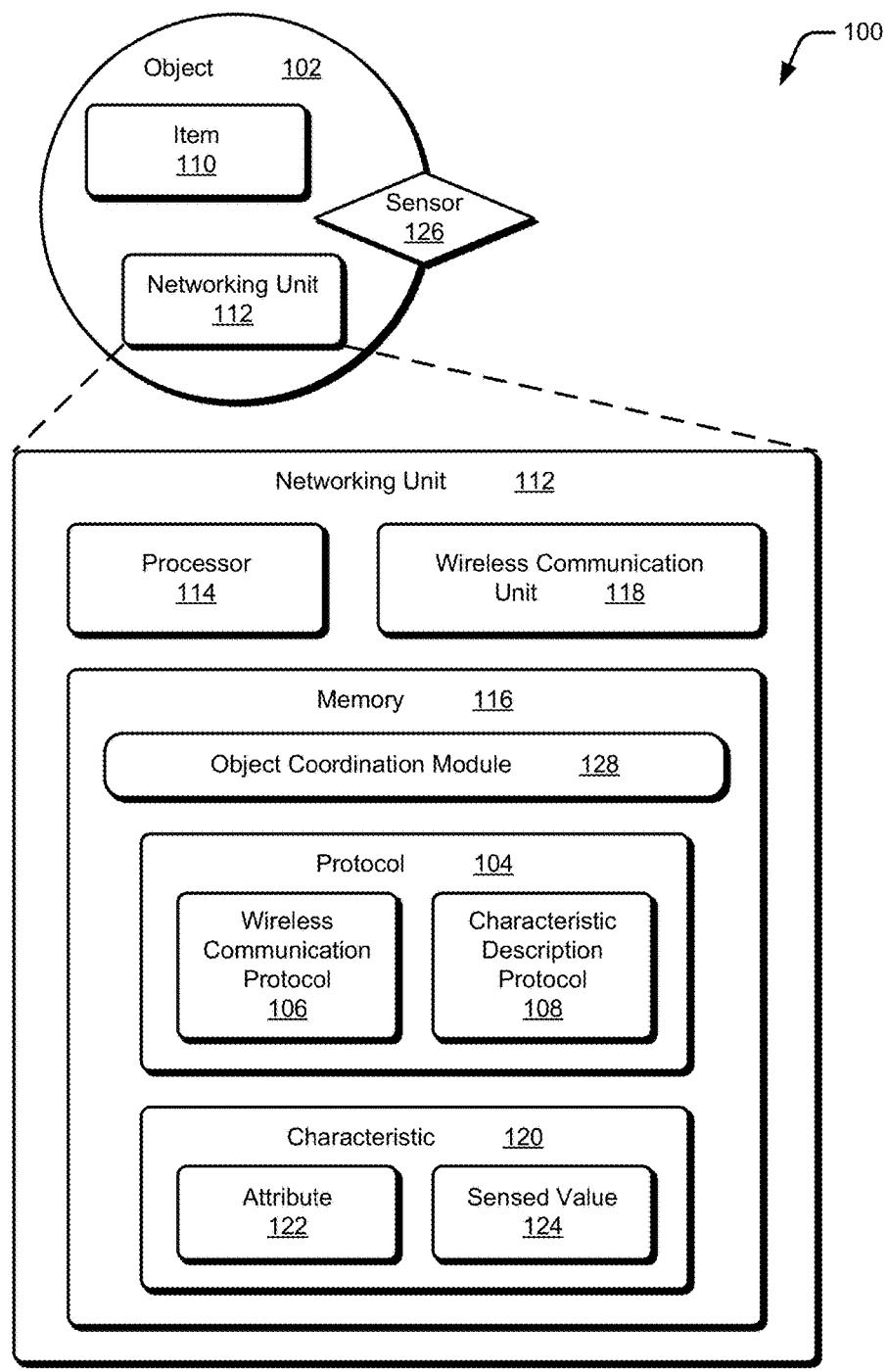
FIG. 1 depicts an example object that may be used to implement embodiments of object amalgamation based on categorization and protocol granularization.

Conventional approaches to delivering on the promise of the Internet of Things involve having Internet of Things objects communicate directly with the cloud and communicate using a single standard protocol. These two approaches unfortunately entail a number of drawbacks. First, being limited to communicating directly with the cloud prevents Internet of Things objects from being grouped into local networks. Consequently, a collective intelligence of a group of objects cannot be created, much less utilized. Further, privacy is also compromised if Internet of Things objects are forwarding information, including sensor readings, up to the cloud and thus out of an end user's control.

A second drawback is that a single standard protocol prevents different kinds of objects from providing unique or product-specific information. With a single standard protocol across many different product categories, a "lowest-common-denominator" (LCD) scheme has to be adopted across numerous types of objects, which results in only basic information being made available by Internet of Things objects. Consequently, different or unusual features of different types of objects cannot be leveraged effectively and thus the uniqueness of these different types of objects is lost. Taken together, these two conventional approaches block a significant portion of the potential capabilities of a richer, more-connected world.

In contrast, for certain embodiments described herein, different types of objects correspond to different protocols, and different objects may belong to different categories. For example, objects may belong to one or more household appliance categories, and the objects are further separable into an outdoor household appliance category or an indoor household appliance category. Objects may also be separated into increasingly finer or specialized categories that are configured as hierarchical subcategories to these categories. Indoor household appliance objects, for instance, may be separable into a kitchen appliance subcategory and a media room appliance subcategory. Subcategories may be further subdivided into segments, such as by separating kitchen appliance objects into dishwasher, refrigerator, oven, and small kitchen appliance segments. Each kitchen appliance segment may therefore correspond to a unique protocol that is finely-tailored to support the expression of segment-specific data. A "dishes are clean" characteristic, for instance, is applicable to dishwasher products but not to refrigerator products.

More generally, each category or subcategory of objects may be assigned an individual protocol that is tailored to the features or characteristics of objects that belong to the category. Clothes objects can have one protocol, for instance, and auto parts can have another protocol. By increasing protocol granularity generally, individual protocols can be narrowly focused on the features and characteristics of objects belonging to a given category. This narrow focus enables, conversely, a more expansive and detailed coverage of those features and characteristics of a category of objects that are unique or special to the category, without trying to use a protocol that is too extensive, complicated, or unwieldy. For example, clothes objects can indicate a fabric type, a color, a pattern, and a style level, but auto part objects can indicate a make, a model, and a sensed physical condition. By expanding the overall coverage of object characteristics by focusing different protocols on individually-targeted categories, a more diverse selection of object characteristics is made available for analysis. In other words, even if a protocol for a particular category of objects effectively adheres to an LCD scheme for the particular category, the protocol is nevertheless closer to expressing a full suite of the potential features of a given product belonging to the category. Hence, product-specific data can be better leveraged across connected objects of the same category.

In this way, an object may be associated with one or more characteristics that reflect features offered by a given product. Examples of characteristics include attributes and sensed values. An attribute represents an intrinsic quality or aspect of an object that is unlikely to change over time. A sensed value, on other hand, may be transient and represents some aspect of the object or the object's environment that is detected by an onboard sensor of the object. With a milk object, for instance, "whole" may be an intrinsic attribute, and "50% remaining" and "expired" may be sensed values. With a clothing object, "flannel" and "red plaid" may be intrinsic attributes, and "clean" may be a sensed value.

For other example embodiments, objects applicable to the Internet of Things are capable of amalgamating into local groups as subnetworks. For a given subnetwork of objects, information can be exchanged locally and synthesized by an object that is in communication with the subnetwork. Additionally, roles may be defined, such that an object with a coordinator role can identify a number of objects that are related or unrelated to each other based on the objects' respective categorizations. The coordinator object establishes, for example, a subnetwork that includes related or unrelated objects. Once a subnetwork is formed, each object of the subnetwork can contribute a characteristic associated with the object. After collecting associated characteristics from a number of different objects, the coordinator object amalgamates the characteristics to enable a more knowledgeable and comprehensive recommendation or other report to be made. In this manner, privacy can be increased by keeping object characteristics locally at an end-user's device that is formulating the report. Moreover, collective object intelligence is increased by enabling characteristics from multiple objects to be analyzed as group. For example, instead of each individual product in a kitchen being aware of merely the product's own presence or remaining amount, a sum total of what ingredients are available for making dinner may be ascertained and used to make meal recommendations.

With a clothing category example, characteristics of different clothing items may be amalgamated and analyzed. Consider a scenario in which a shirt, some pants, a pair of shoes, a tie, and a watch each have an embedded sensor. In this case, the watch may function as a coordinator object. As a clothing ensemble is put together, each clothing object communicates the clothing item's "information state" to the other clothing objects, or at least to the coordinator object. Any object may approve or disapprove of a given combination of clothes based on color, material, style, and so forth. Alternatively, the watch, as the coordinating object, can make decisions on behalf of the other objects. Because the subnetwork of objects is tightly coupled by virtue of a common and richly-detailed protocol appropriate for clothing items, each object understands the other objects, and mutual benefit accrues to the various objects and ultimately to the user of the objects. Furthermore, the coordinator object may communicate over the internet to perform an analysis of the objects in combination, such as by considering a proposed clothing ensemble. Using a comparison enabled via the internet access, the coordinator object may determine, for instance, if an ensemble looks like a famous person's outfit or if an ensemble is too reminiscent of a bygone era.

Thus, to facilitate sharing and utilization of object characteristics, subnetworks of objects are formed. If a subnetwork is formed from objects that correspond to a same protocol, an object of the protocol-homogeneous subnetwork can produce a combined characteristic entity, such as a data structure or an independent agent. The combined characteristic entity (e.g., a collection of characteristics for a clothing ensemble) is usable to jointly analyze multiple characteristics that are amalgamated across multiple objects. Alternatively, multiple objects that correspond to different protocols may be amalgamated into a single subnetwork. A protocol-heterogeneous subnetwork may be formed by, for example, a local coordinator object that is capable of translating wireless communications between two different protocols. Generally, a subnetwork may be created in a peer-to-peer (P2P) manner, may be created with a hub—such as by using a translating coordinator object, and so forth.

In the following discussion, after some example terminology is set forth, example aspects of objects and protocols are presented. Example systems and schemes relating to objects and corresponding protocols are then described in the context of multiple scenarios. Thereafter, example procedures are presented with reference to the example systems and schemes. However, the example procedures are not limited to the example systems and schemes, and the example systems and schemes are not limited to performance of the example procedures.

Terminology Examples

Example descriptions or explanations of certain terms as used herein are set forth below. Each term is applicable to one or more, but not necessarily all, embodiments that are presented herein. Some terms are further elucidated using one or more examples.

The "Internet of Things" (IoT) refers to things that store, sense, or otherwise obtain data and provide the data via a network connection. The things in an IoT environment may be called objects. The objects can include memory that stores the data or sensors that are used to obtain the data.

An "object" refers to an item that has sufficient technology or adequate intelligence to communicate with a network or over a network. An item may be realized as a physical article that is manufactured, grown, harvested, or otherwise produced. Examples of objects include products, packaging, sensors, clothes, food, household appliances, industrial machines, electronic devices, furniture, medicine bottles or other containers, sporting equipment, automotive parts, garage or shop tools, and combinations thereof. An object may include a product or a networking unit. A "product" refers to something that is produced by one person and purchased by another person, such as a television or a laundry detergent. A "networking unit" refers to electronic hardware that enables an object to communicate wirelessly or to participate in the Internet of Things.

An "object amalgamation" or "amalgamating" refers to a grouping of objects into a subnetwork in order to facilitate inter-object communication across disparate protocols or to a bundling of object characteristics by an object into a collection of characteristics that is jointly analyzable as a whole. This collection of characteristics is termed a combined characteristics entity herein. Objects may be grouped by category such that characteristics associated with individual objects of the group of objects are similar or may be grouped by corresponding protocol to facilitate inter-object sharing of characteristics.

A "category" refers to an identifiable subset of objects of a same or related type. Examples of categories include tools, vehicles, cleaning products, books, appliances, food, automotive parts, or clothes. An object may belong to at least one category. An "indication of a category" refers to a name, a code, a discernable formatting, etc. from which the category may be identified or via which a functional description of an associated protocol may be obtained. A category indication may be used to identify a protocol for an object of the category or to obtain a specification of the protocol sufficient to understand or formulate communications created in accordance with the protocol.

A "protocol" refers to a set of rules specifying how a communication is to be effectuated. A "specification of a protocol" refers to information usable by an object to interpret a communication created in accordance with the given protocol or to create a communication in accordance with the given protocol. A protocol may be a wireless communication protocol or a characteristic description protocol. A "wireless communication protocol" refers to how an object formulates, transmits, receives, or unpacks wireless communications exchanged with other objects. A "characteristic description protocol" refers to how characteristics are to be organized, expressed, or arranged for communication to other objects, such as a meaning or availability of particular fields of a communication or data structure. A "protocol indicator" refers to an alphanumeric value, a version number, a name, a sequence of bits in a field, etc. that represents a protocol. A protocol indicator may be included in a wireless communication, such as one transmitted to establish a wireless link or to facilitate subnetwork formation.

A "granularization" refers to a degree to which a protocol is sufficiently specialized so as to enable category-specific object characteristics to be expressed. For example, if the granularization of category descriptions is increased, fewer objects fit within a particular category. However, because fewer objects fit within the particular category, a protocol corresponding to the particular category can be more narrowly targeted at characteristics that are unique to objects of the particular category. Thus, as granularization increases, a number of characteristics that may be expressed within a protocol of a given size or complexity likewise increases.

A "coordination" refers to efforts made by an object to enable organization, formation, or operation of a subnetwork using, for instance, wireless communications with other objects. Coordination may be effectuated by initiating formation of a subnetwork of objects, performing translations of communications between two or more protocols, linking two subnetworks by serving as a common object that funnels communications between the two subnetworks, acting as a coordinator object, collecting characteristics from objects, acting as a hub of a subnetwork, some combination thereof, and so forth.

A subnetwork refers to a local network of objects in which at least some inter-object communication may be accomplished without relying on the internet. With a subnetwork, intelligence for operating the local network of objects is at least principally located within the local network, such as at an object. A subnetwork may be implemented as an ad hoc network, an infrastructure network, a peer-to-peer network, a Wi-Fi network, a micro network, a Bluetooth-based network, a proprietary network, some combination thereof, and so forth. Two subnetworks may be linked by a common object.

A "wireless communication" refers to an exchange of information between at least two objects without a wired medium. A "wireless link" refers to an established capability to propagate a signal over a non-wired medium from one object to another object. A wireless link may be established between two objects if one object explicitly or implicitly acknowledges receipt of a communication transmitted from another object via a responsive transmission, including a passive or reflective type of transmission.

An "establishment" of a wireless link refers to an exchange of wireless communications, such as a transmission by one object and an acknowledgment of receipt by another object, or a transmission by one object and a modulated reflection of the transmission by another object. A wireless link between two or more objects may be established as part of a subnetwork formation. A wireless link can be continuous over multiple wireless communications, such as through use of a session scheme, or discrete for each wireless communication.

A "functionality" refers to a capability of an electronic device to engage in processing that can provide a person-perceptible result. A computing functionality for an object or "object functionality" pertains, for example, to operations performed by an object that are based on or utilize characteristics gathered from multiple different objects. A person-perceptible result can include a report provided to an end user. Functionality may include generating a command. A "command" refers to an instruction or a request for an electronic device to implement some action, such a performing a computation, taking a sensor reading, making a transmission, some combination thereof, and so forth.

A "characteristic" refers to information that is associated with, and may be provided by, an object. Examples of characteristics include an attribute that is intrinsic to the object and a value that is sensed by the object. An attribute may be loaded before or after an object is placed in service. Examples of attributes include a color of a shirt, an ingredient in a cake mix, and a make/model compatibility of an auto part. A sensed value may be obtained from a sensor of an object while the object is deployed in service by an end user. Examples of sensed values include clean versus dirty for a skirt, current weight of contents for a box of cereal, and percent of remaining life for an auto part.

A "diverse suite of characteristics" refers to respective sets of characteristics that are expressible by respective protocols in a meaningful and thorough manner because protocol granularization enables protocol specialization. Each suite of characteristics for a given protocol can be narrowly tailored or focused to accommodate those characteristics that are particularly relevant to a category of objects that is associated with the given protocol.

A "combined characteristic entity" refers to a collection of characteristics instantiated together in a manner that facilitates joint analysis of the individual characteristics forming the collection. The characteristics may be collected from different objects. Examples of a combined characteristic entity include a data structure, part of an autonomous agent, a portion of a database, an integrated package of inter-linked object characteristics, or some combination thereof.

A "translation" refers to a conversion of a wireless communication from comporting with one protocol to comporting with a different protocol. A "conversion" or "converting" may be effectuated, for example, by changing air interface parameters, by altering an arrangement of characteristics, or by substituting terminology used to represent characteristics. A translation may be performed from one protocol that is associated with one object category to another protocol that is associated with another category or to a base protocol that spans multiple categories or subcategories. Protocol translation may be enabled via a translation layer that is implemented by developers for different protocols as the protocols are created or evolve in a manner analogous to that used for implementing drivers.

A "report" refers to a presentation for an end user of a conclusion or an inference drawn by a computing device based on characteristics collected from multiple objects. Examples of reports include recommendations and notices. A "recommendation" refers to an option that is set forth as a suggestion to be adopted by the end user, such as clothing ensemble to wear for the day. A "notice" refers to an announcement of a list of available options, such as five possible entrées that may be prepared within 20 minutes using ingredients that are already at home. Reports may be impacted by one or more factors.

A "factor" refers to a variable that can affect how an object analyzes a collection of characteristics. Examples of factors include weather, a calendar schedule, a received communication, proximity of an end user or acquaintance, an end user preference, and so forth. A factor may be obtained from a cloud service. A "cloud service" refers to a service, such as an email or an accounting or a search service, that is provided from or via the internet using one or more servers or at least one data center. A "preference" for an end user refers to an indication of a relative desire or appreciation for one possibility over one or more other possibilities. Examples of preferences include pants over shorts or a skirt if a high temperature is less than 80 degrees or high carbohydrate meals on Tuesdays and Thursdays. Preferences may be established manually or directly by an end user, by inferring preferences based on past choices of the end user, by applying a default set of preferences appropriate to an end user based on demographics or social network connections, and so forth.

Additionally, unless context dictates otherwise, use herein of the word "or" may be considered use of an "inclusive or," or a term that permits inclusion or application of one or more items that are linked by the word "or" (e.g., a phrase "A or B" may be interpreted as permitting or being relevant to just "A," to just "B," or to both "A" and Example Aspects of Objects and Protocols FIG. 1 depicts at 100 generally an example object 102 that may be used to implement embodiments of object amalgamation based on categorization and protocol granularization. As shown, the object 102 includes an item 110, a networking unit 112, and a sensor 126. The networking unit 112 includes a processor 114, a memory 116, and a wireless communication unit 118. The memory 116 includes at least one object coordination module 128, at least one protocol 104, and at least one characteristic 120. The protocol 104 includes a wireless communication protocol 106 or a characteristic description protocol 108. The characteristic 120 includes an attribute 122 or a sensed value 124.

In one or more embodiments, the object includes at least the networking unit 112. The object 102 may further include at least one item 110, such as a physical article that is manufactured, grown, harvested, or otherwise produced. Examples of items 110 include clothes, food, household appliances, industrial machines, electronic devices, furniture, medicine bottles or other containers, sporting equipment, automotive parts, and garage or shop tools. An item 110 may be a product that is sold or purchased, used repeatedly, consumed over one or more uses, or some combination thereof, and so forth. If the object 102 is an electronic device like a smart phone or a tablet, then the item 110 and the networking unit 112 may be integrated together.

The object coordination module 128 of the networking unit 112 enables the object 102 to communicate wirelessly, participate in the Internet of Things, implement the techniques described herein, some combination thereof, and so forth. The object coordination module 128 comprises instructions that the processor 114 is to execute to implement described computing functionality. Examples of computing functionality include amalgamating objects into subnetworks, interpreting communications corresponding to different protocols, translating communications between two different protocols for other objects, amalgamating object characteristics together so that the characteristics can be jointly analyzed, and combinations thereof. The wireless communication unit 118 is capable of receiving or transmitting wireless signals to exchange one or more wireless communications (not shown in FIG. 1) in accordance with the protocol 104.

The processor 114, the memory 116, or the wireless communication unit 118 may be implemented anywhere along a continuum of component complexity and capability, such as from one or more relatively simple-featured, low-resource components up to one or more relatively full-featured, high-resource components. For example, on one end of the feature-resource spectrum, the networking unit 112 may be realized as a radio frequency identification (RFID) tag that operates passively by reflecting back a modulated or encoded version of a received RF signal or by otherwise harvesting ambient energy. On the other end of the feature-resource spectrum, the networking unit 112 may be realized as an end-user electronic device such as a smart phone, a tablet computer, a wearable device, an entertainment appliance, a digital assistant, some combination thereof, and so forth. Example implementations of a relatively full-featured, high-resource device with descriptions of a processing system, computer-readable media, etc. are provided below with reference to FIG. 12.

The object 102 corresponds to at least one protocol 104. One or more protocols 104 may be considered to correspond to the object 102, or vice versa, if the object is capable of utilizing, operating in accordance with, or understanding the corresponding protocol. Examples of protocol correspondence include an ability to interpret a communication comporting with a given protocol, an ability to formulate a communication in accordance with a given protocol, a capability to transmit a communication using a given protocol, a capability to receive a communication that was transmitted using a given protocol, and combinations thereof. The protocol 104 may be realized as a written description, an algorithm, an operational scheme, a combination thereof, etc. that is at least partially stored in the memory 116. However, the protocol 104 is actually implemented with computing logic, which may include the processor 114. Although shown separately, the processor 114 and the memory 116 may be implemented together, such as with hard-coded logic as is known.

Two examples of a protocol 104 are: a wireless communication protocol 106 and a characteristic description protocol 108. The wireless communication protocol 106 represents how the networking unit 112, or more specifically the wireless communication unit 118, formulates, transmits, receives, or unpacks wireless communications exchanged with other objects. Examples of the wireless communication protocol 106 include a wireless communications standard (e.g., Bluetooth, Wi-Fi, or a proprietary standard), an air interface specification, guidelines for operating across any one or more of layers 1-3 of the Open Systems Interconnection model (OSI Model), or some combination thereof.

The characteristic description protocol 108 represents how characteristics of the object 102 are to be organized, expressed, or arranged for communication to other objects.

Examples of the characteristic description protocol 108 include a layout, a specification, scripting rules, a format, a meaning or content for one or more identified fields, or some combination thereof. The characteristic description protocol 108 may specify different descriptive parameters for different kinds of object characteristics 120. Examples of kinds of characteristics 120 for objects 102 include attributes 122 and sensed values 124.

An attribute 122 of an object 102 is a description, an explanation, a date, a quality, etc. of a permanent or intrinsic aspect of the object 102. For example, an attribute 122 of a golf club object may have a brand or a type and number (e.g., "Brand X" or "3 wood"), and an attribute 122 of a box of cereal may have a description and a health notation (e.g., "crisped rice" and "gluten-free"). Generally, an attribute 122 is unlikely to change during the life cycle of the object 102. A sensed value 124 of an object 102, on the other hand, is a number, a range, a label, a changing description of a transient or variable aspect, etc. of the object 102. For example, a label of a sensed value 124 of an oven may be "hot" or "functioning fine." A description of a sensed condition for a jug of milk may be "75% remaining" and for a shirt may be "clean."

In certain example implementations, the object 102 may also include a sensor 126 to generate a sensed value 124. Although shown separately in FIG. 1, the sensor 126 and the networking unit 112 may be integrated together. The sensor 126 may sense usage of the object 102, a condition or status of the object 102, ambient environmental conditions, movement of the object 102, position or location of the object 102, some combination thereof, and so forth. Examples of sensors 126 include a wear sensor, a water sensor, a pressure sensor, a camera, a temperature sensor, an accelerometer, a magnetometer, a torque sensor, a weight sensor, a microphone, a chemical sensor, a rotational or linear speed sensor, a vibration sensor, a motion detector, or some combination thereof.

The protocol 104, or the characteristic 120, may be tailored to a category to which a given object 102 belongs. An example of an object category is clothing. A shirt object, for instance, may correspond to a general clothing protocol or a shirt-specific clothing protocol. With a clothing category of objects, the characteristic description protocol 108 may be tailored for expressing attributes 122 or sensed values 124 that are particularly applicable to clothes. Examples of clothing-related characteristics 120 include color, pattern, wear-ability status (e.g., "clean" or "dirty"), style code, and compatibility. An example protocol for communications with or by clothing objects follows:

```
{
    id: "Brand-Name-polo-65223",
    messageType: "clothing-status",
    attributes: {
        color: "blue",
        pattern: "crosshatch"
    },
    status: "worn loosely"
}
{
    id: "Brand-Name-freeglide",
    messageType: "compatibility-status",
    compatibleWith: {
        shirtColors: [
            "yellow",
            "red",
            "blue"
        ]
```

-continued

```
    }
}
```

Figure 2:
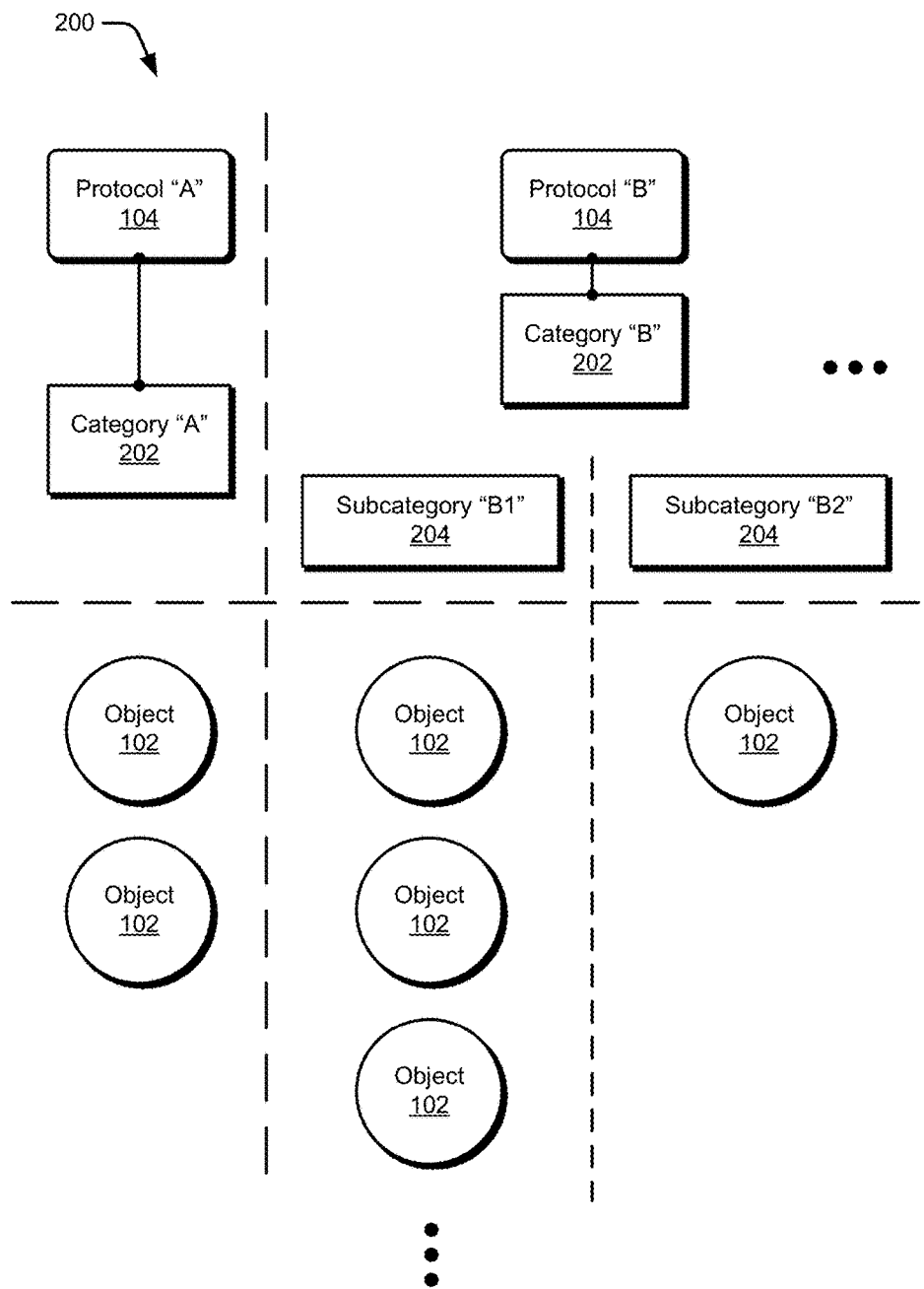
FIG. 2 illustrates an example classification of objects into categories or subcategories.

FIG. 2 illustrates an example classification 200 of objects 102 into categories 202 or subcategories 204. As shown, the classification 200 includes two categories 202: a category "A" 202 and a category "B" 202. The classification 200 also includes two subcategories 204 under the category "B" 202: a subcategory "B1" 204 and a subcategory "B2" 204. Objects 102 may belong to at least one category 202 or subcategory 204. Although two categories 202 and two subcategories 204 are shown in FIG. 2 and described below, a different number of categories 202 or subcategories 204 may be implemented. Although not explicitly so depicted in FIG. 2, an object 102 may belong to more than one category 202 or subcategory 204.

In one or more example embodiments, objects 102 are assigned a protocol 104 based on a category 202 to which the object 102 belongs. Each category 202 is associated with a protocol 104 that is tailored for the associated category 202. As shown, the category "A" 202 is associated with the protocol "A" 104, and the category "B" 202 is associated with the protocol "B" 104. To the extent that there is a lowest-common-denominator (LCD) scheme or effect on a design of a protocol 104 for a given category 202, the negative consequences of the LCD effect are reduced due to protocol granularization because a given protocol 104 can be designed so as to focus on characteristics that are relevant to the objects 102 that belong to a given category 202.

An example scenario pertaining to clothing and food is presented. Clothes objects 102 can be assigned to a clothing category 202 (e.g., category "A"), which is associated with a protocol (e.g., protocol "A") tailored for clothing characteristics. Similarly, food objects 102 can be assigned to a food category 202 (e.g., category "B"), which is associated with a protocol (e.g., protocol "B") tailored for food characteristics. A given category 202 may be further subdivided into subcategories 204. A food category "B" 202, for instance, may be divided into a refrigerated food subcategory "B1" 204 and a non-refrigerated food subcategory "B2" 204. Although not shown, each subcategory 204 may be associated with a sub-protocol. Respective sub-protocols may be separate from a higher-level protocol 104 or may be extensions of the higher-level protocol 104 that focus on distinct characteristics of objects 102 respectively belonging to the subcategories 204. For example, a sub-protocol for a refrigerated food subcategory 204 may include provisions for tracking or reporting an average ambient temperature to which the refrigerated food object has been exposed over time.

Figure 3:
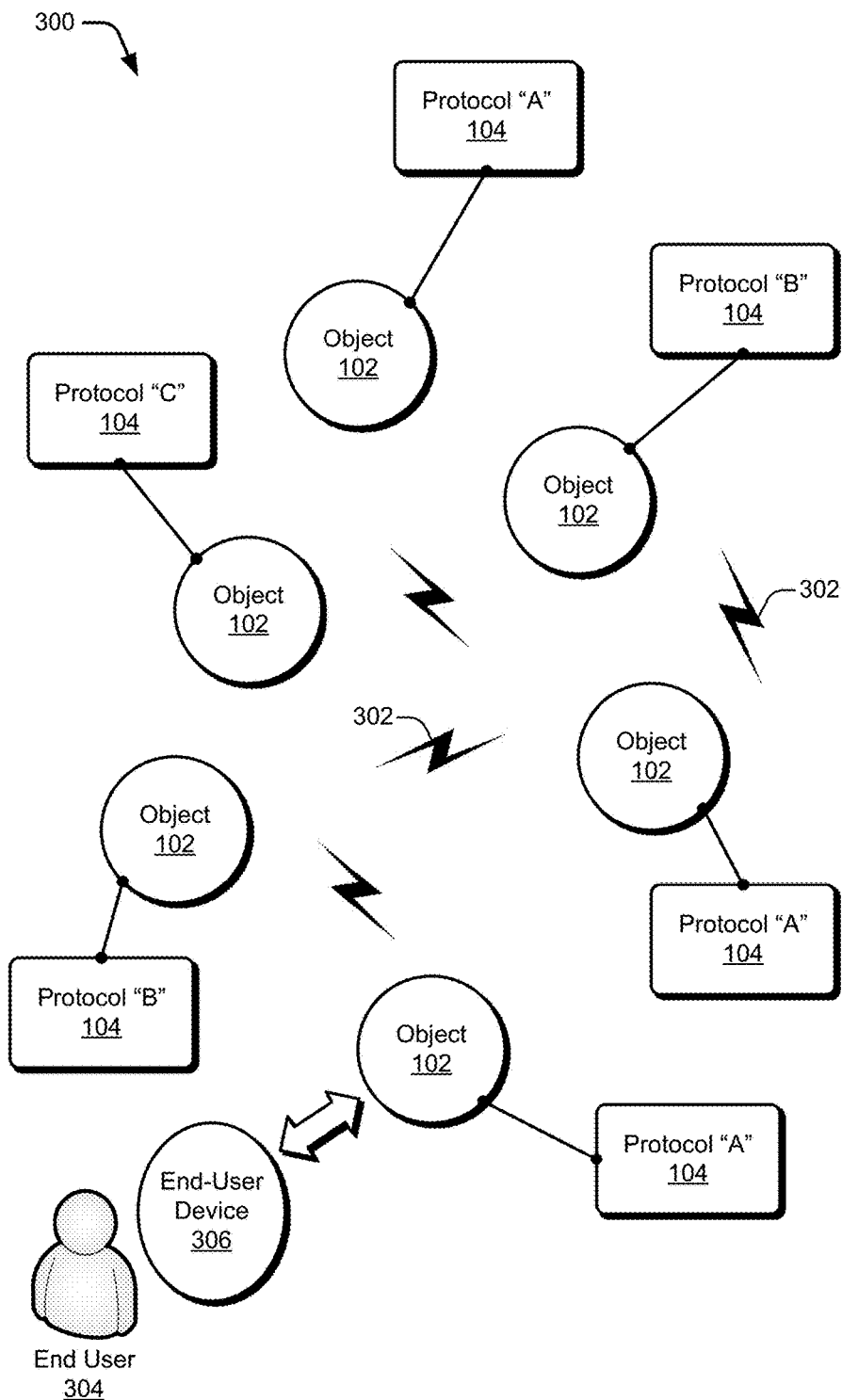
FIG. 3 depicts an environment having multiple objects with corresponding protocols for example embodiments that are operable to employ techniques described herein relating to object amalgamation based on categorization and protocol granularization.

FIG. 3 depicts an environment 300 having multiple objects 102 with corresponding protocols 104 for example embodiments that are operable to employ techniques described herein relating to object amalgamation based on categorization and protocol granularization. Each object 102 corresponds to a protocol 104, as indicated by a respective line with two terminating dots connecting a respective object with a respective protocol. As shown, three objects 102 correspond to protocol "A" 104; two objects 102 correspond to protocol "B" 104; and one object 102 corresponds to protocol "C" 104. Objects 102 are capable of communicating with each other by exchanging one or more wireless communications 302.

An end user 304 owns, manages, controls, or interfaces with the multiple objects 102. The end user 304 is capable of interacting with one or more of the objects 102 using, for example, an end-user device 306. The end-user device 306 may be implemented as an object 102 or may be a separate electronic device. The end-user device 306 may be implemented or realized as any suitable type of computing device. Examples of the end-user device 306 include, but are not limited to, a desktop computer, a laptop computer, a mobile device (e.g., assuming a handheld configuration such as a tablet, a mobile phone, or a phablet), a mobile device coupled to a separate screen, an entertainment appliance such as a smart television, a game console, a device that is capable of receiving gesture input, a device that is capable of receiving speech or video input, a device that is capable of providing 2D or 3D image output, a device that is capable of providing sound output, a wearable computing device such as a smart watch or intelligent glasses, or some combination thereof. Thus, end-user devices 306 may range from relatively high-resource devices with substantial memory and processor resources (e.g., personal computers or game consoles) to relatively low-resource devices with constrained memory or processing resources (e.g., mobile devices such as wearables).

Having considered an example environment, as well as example aspects of objects and protocols, consider now a discussion of some example details of the systems or schemes for object amalgamation based on categorization and protocol granularization in accordance with one or more embodiments. Examples of subnetwork formation, protocol translation, usage of object characteristic information, and so forth are described in the following section.

Example Systems and Schemes

This section describes some example details of systems and schemes for object amalgamation based on categorization and protocol granularization in accordance with one or more embodiments. FIGS. 4-7B illustrate example schemes for grouping objects into one or more subnetworks. FIG. 8 illustrates an example environment including a system of objects that can is used to describe procedures.

Figure 4:
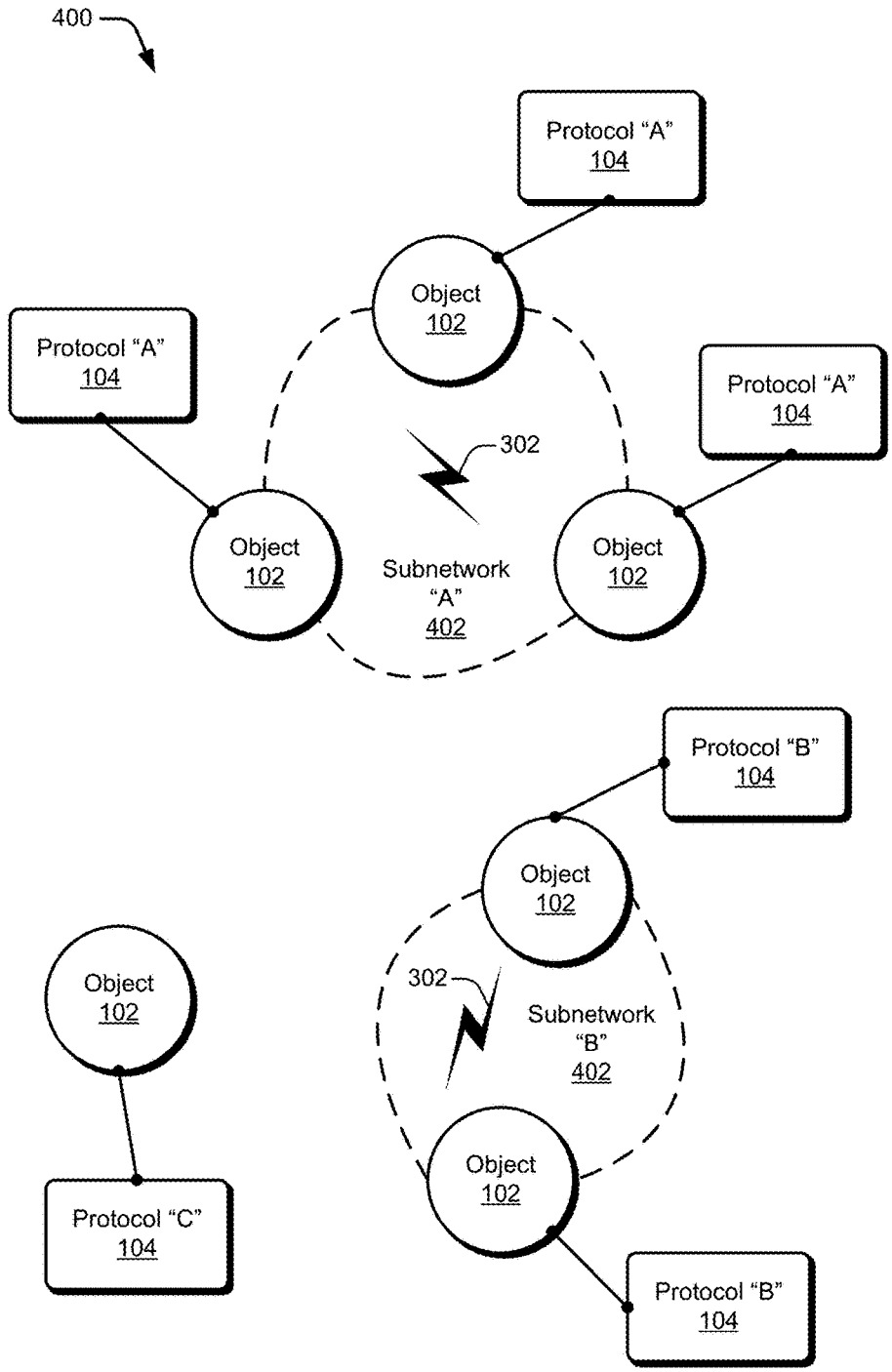
FIG. 4 illustrates an example of object grouping and subnetwork formation based on the protocols that correspond to the various objects.

FIG. 4 illustrates at 400 generally an example of object grouping and subnetwork formation based on the protocols 104 that correspond to the various objects 102. The same six object-protocol pairs depicted in FIG. 3 are also shown in FIG. 4. Specifically, there are three objects 102 that correspond to the protocol "A" 104, two objects 102 that correspond to the protocol "B" 104, and one object 102 that corresponds to the protocol "C" 104. In FIG. 4, however, the objects 102 are grouped based on corresponding protocols 104.

In one or more example embodiments, objects 102 are adapted to self-organize into subnetworks 402 in which each object 102 forming a part of a subnetwork 402 is capable of understanding or using the corresponding protocol 104 of the subnetwork 402. The three objects 102 that correspond to the protocol "A" 104 are grouped together into a subnetwork "A" 402. The two objects 102 that correspond to the protocol "B" 104 are grouped together into a subnetwork "B" 402. Within a given subnetwork 402, each object 102 may communicate with other objects 102 of the given subnetwork 402 via wireless communications 302 using the protocol 104 that corresponds to the given subnetwork 402. For subnetwork "A" 402, for instance, the objects 102 thereof may communicate using wireless communications 302 that are formulated or transceived in accordance with the corresponding protocol "A" 104.

In order to establish groups, at least one object 102 advertises the corresponding protocol 104 that the object 102 understands. Other objects 102, upon detecting a broadcast advertising a compatible protocol, may cease or avoid starting the broadcasting of advertisements. Instead, the other objects 102 may transmit a protocol compatibility indication so that the protocol-compatible objects may group together and establish a subnetwork 402. The objects 102 are shown as being physically re-arranged into groups in FIG. 4 as compared to FIG. 3 for purposes of explanation. The objects 102 may actually be grouped together or logically formed into subnetworks 402 without being physically moved.

Figure 5:
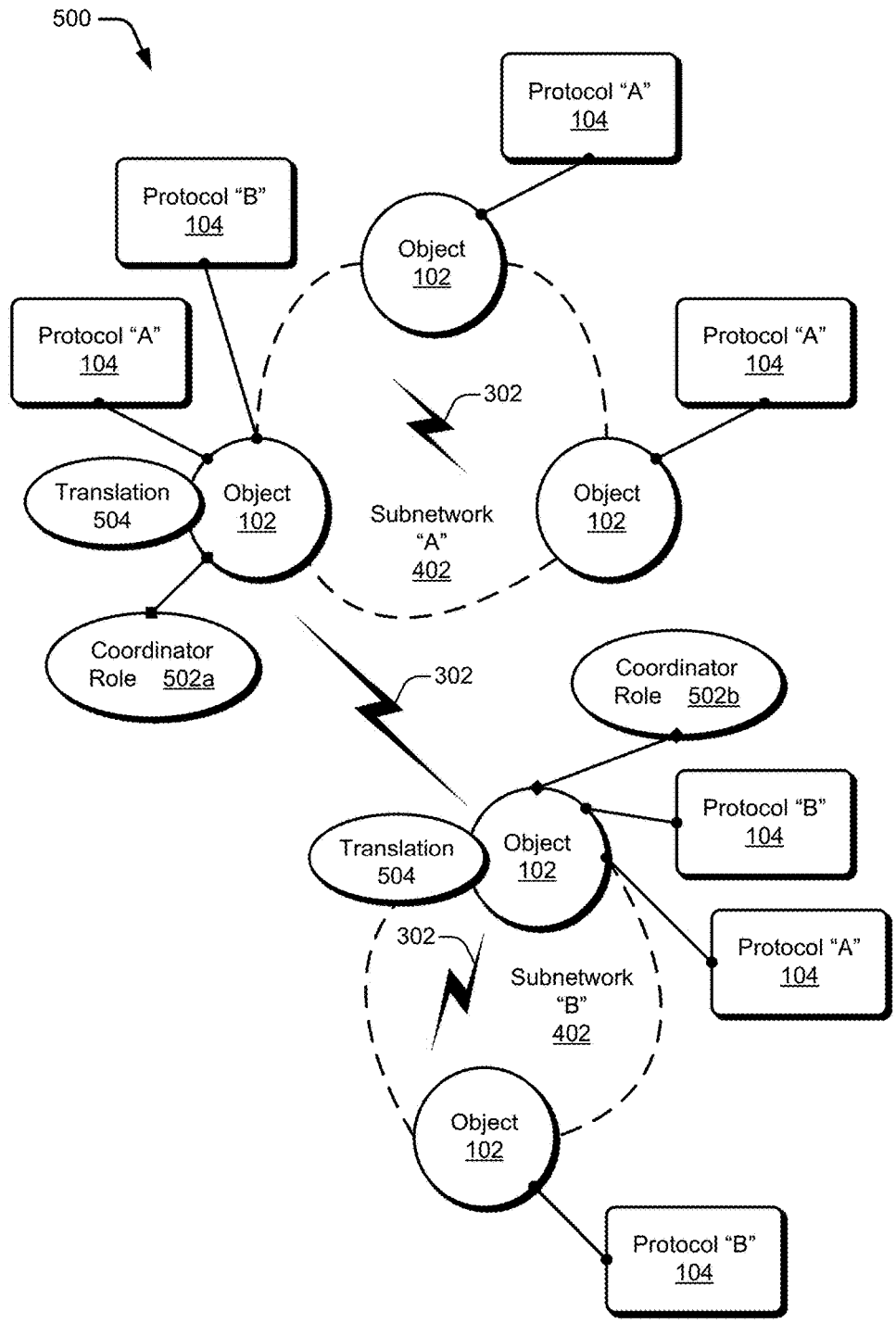
FIG. 5 illustrates an example scenario with multiple subnetworks including an object having a coordinator role.

FIG. 5 illustrates an example scenario 500 with multiple subnetworks 402 including an object 102 having a coordinator role 502. The scenario 500 includes those objects 102 from FIG. 4 that formed into the subnetwork "A" 402 or the subnetwork "B" 402. In one or more example embodiments, at least one object 102 attains a coordinator role 502 in each subnetwork 402. An object 102 that corresponds to the protocol "A" 104 of the subnetwork "A" 402 has a coordinator role 502a. An object 102 that corresponds to the protocol "B" 104 of the subnetwork "B" 402 has a coordinator role 502b. A coordinator role 502 may be attained based on a nomination by one or more objects, including a self-nomination; based on a vote by objects 102 forming or participating in a subnetwork 402; by virtue of being the object that advertised a particular protocol 104 or initiated formation of a subnetwork 402; based on having a translation capability; based on some combination thereof; and so forth.

Some objects 102 may have a capability of performing a translation 504. For example, if an object 102 corresponds to two different protocols 104, the object 102 may be capable of translating between the two protocols 104. As shown, each object 102 having a coordinator role 502 in the scenario 500 understands both protocol "A" 104 and protocol "B" 104. If at least one object 102 understands both protocols 104, then wireless communications 302 may be exchanged between the subnetwork "A" 402 and the subnetwork "B" 402. A wireless communication 302 that corresponds to the protocol "A" 104 may be transmitted from an object 102 of the subnetwork "A" 402 and received by an object 102 of the subnetwork "B" 402. If the receiving object 102 does not have a translation capability, the receiving object 102 can forward the wireless communication 302 to the object 102 having the coordinator role 502b. The coordinator object 102 translates the wireless communication 302 that corresponds to the protocol "A" 104 into a wireless communication 302 that corresponds to the protocol "B" 104 and returns the translated wireless communication. Alternatively, wireless communications 302 may be exchanged directly with at least one object 102 having the translation capability 504.

The protocol translation 504 may pertain to a wireless communication protocol 106 or a characteristics description protocol 108 (of FIG. 1). With the wireless communication protocol 106, a protocol translation 504 may change or convert a frequency, a modulation, a wireless standard, a channel, a frame or packet construction, an encoding, or another aspect of the wireless communication protocol 106, as described herein, with respect to how a message is exchanged between objects 102. With the characteristics description protocol 108, a protocol translation 504 may change or convert a formatting, an organization, a presentation arrangement, a specified label or value, or another aspect of the characteristics description protocol 108, as described herein, with respect to the content of a message exchanged between objects 102.

Figure 6:
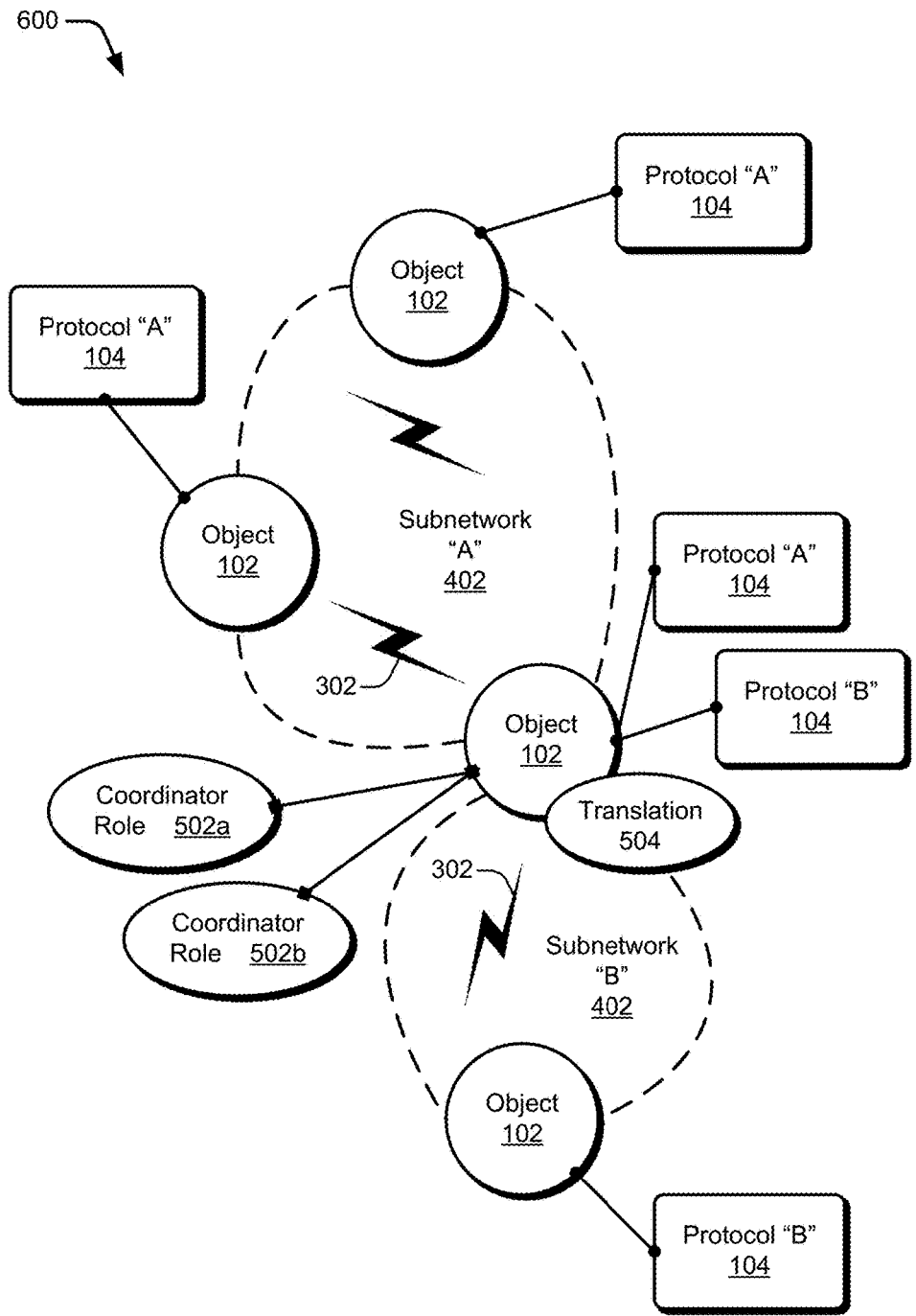
FIG. 6 illustrates an example scenario with multiple subnetworks that are joined by a common object having a coordinator role.

FIG. 6 illustrates an example scenario 600 with multiple subnetworks 402 that are joined by a common object 102 having a coordinator role 502. Two subnetworks 402 that respectively correspond to two different protocols 104 may be linked by a common object 102 that understands both protocols 104. As shown, subnetwork "A" 402 corresponds to protocol "A" 104, and subnetwork "B" 402 corresponds to protocol "B" 104. One object 102 is common to both the subnetwork "A" 402 and the subnetwork "B" 402. This common object 102 understands both protocol "A" 104 and protocol "B" 104. The common object 102 also has a translation 504 capability. Consequently, the common object 102 is capable of translating wireless communications 302 from corresponding to the protocol "A" 104 to corresponding to the protocol "B" 104, or vice versa.

The common object 102 has the coordinator role 502a with respect to the subnetwork "A" 402 and the coordinator role 502b with respect to the subnetwork "B" 402. The common object 102 may link the subnetworks "A" and "B" to each other by performing a translation 504 on a wireless communication 302 and forwarding the wireless communication 302 from an object 102 in one subnetwork 402 to an object 102 in the other subnetwork 402. Additionally or alternatively, the common object 102 may link the subnetworks "A" and "B" to each other by collecting characteristics (not shown in FIG. 6) from objects 102 of both subnetworks 402 and amalgamating the characteristics for joint analysis. In these example manners, the common object 102 is adapted to link the subnetwork "A" 402 with the subnetwork "B" 402. The common object 102 may be an object that initiates formation of the subnetwork "A" 402 or the subnetwork "B" 402.

Figure 7A:
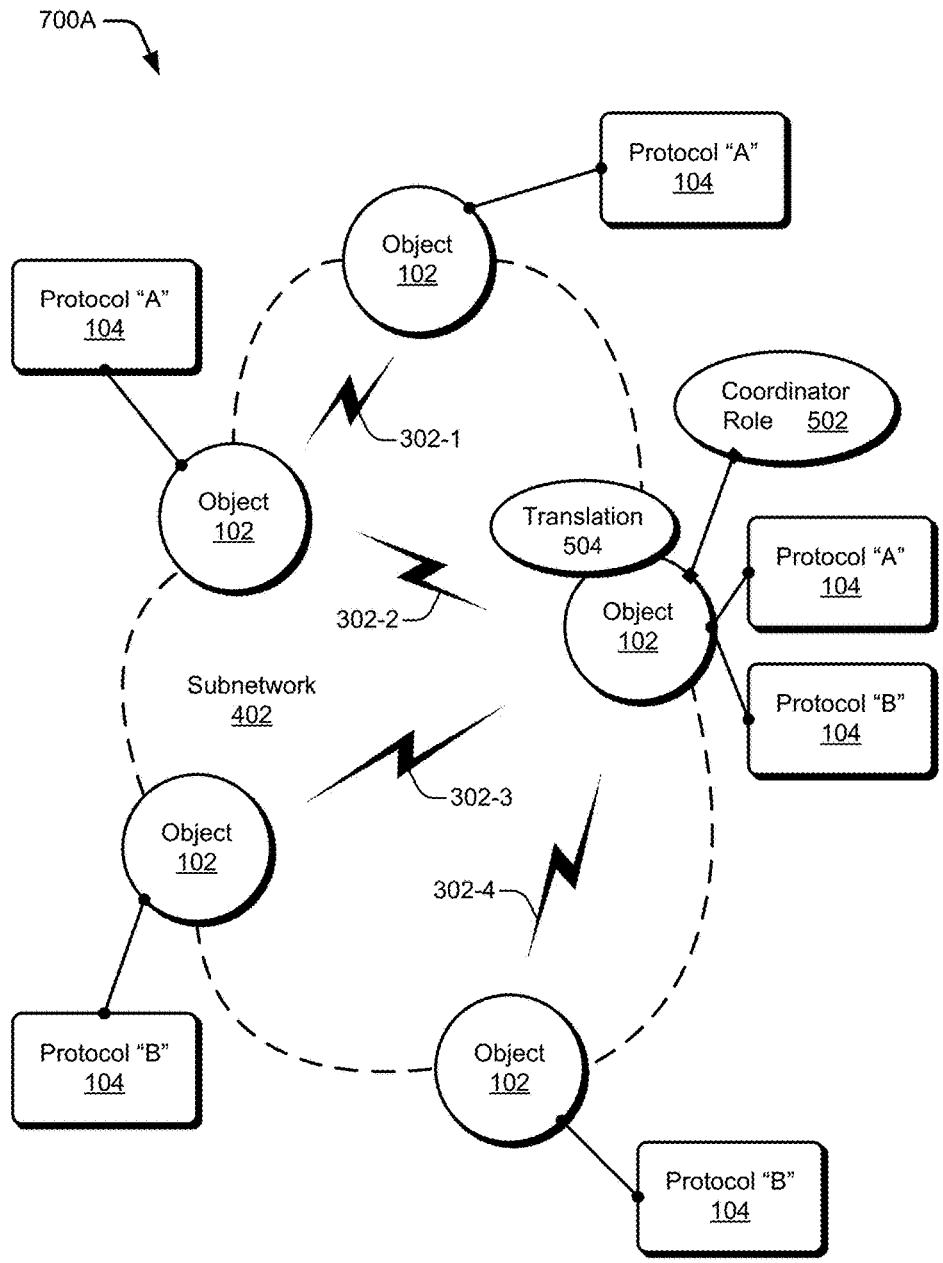
FIG. 7A illustrates an example scenario with a subnetwork including objects corresponding to different protocols.
Figure 8:
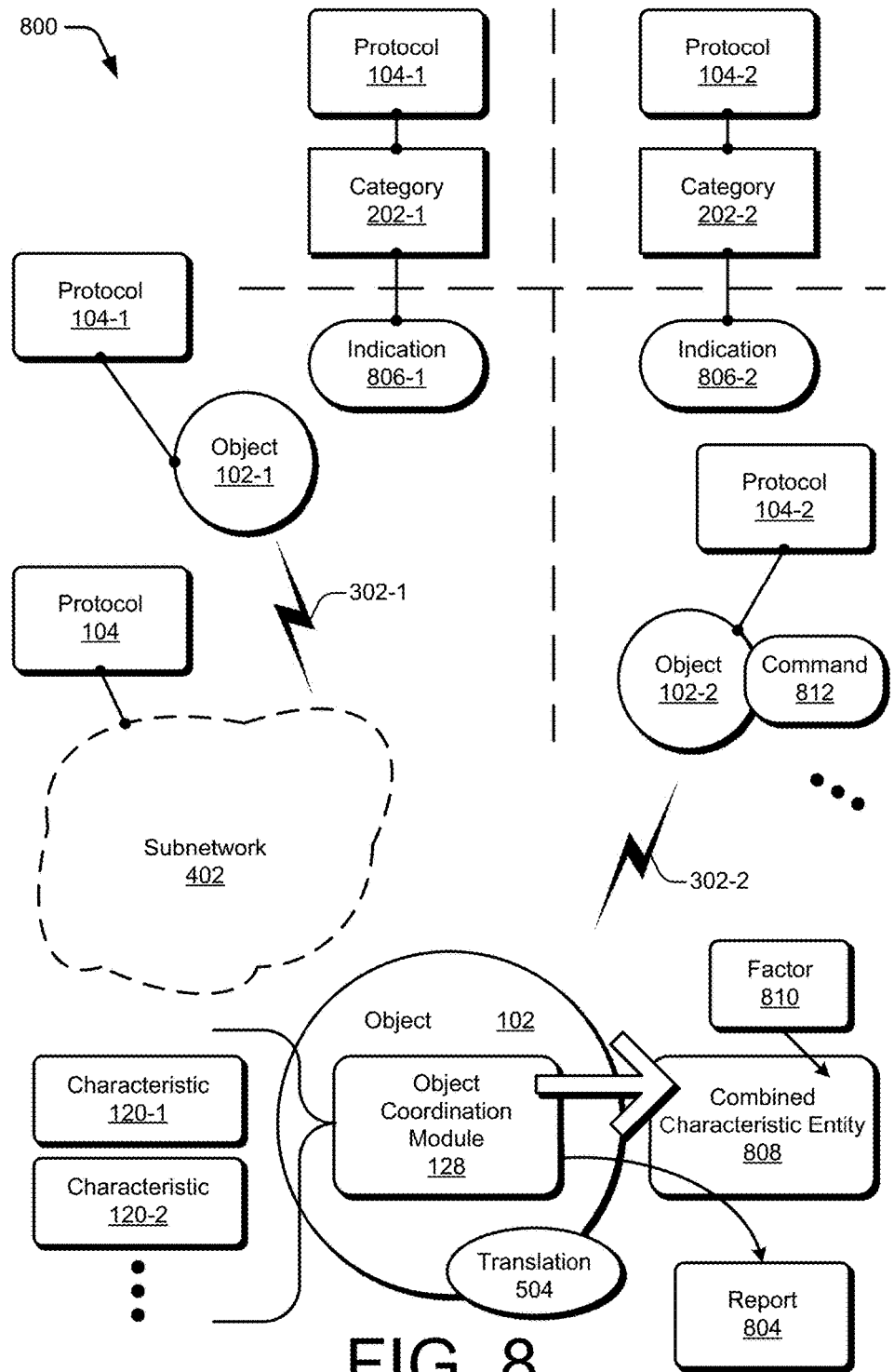
FIG. 8 illustrates an example object environment in which one or more procedures may be implemented.

FIG. 7A illustrates an example scenario 700A with a subnetwork 402 including objects 102 corresponding to different protocols 104. With the subnetwork 402 of the scenario 700A, objects 102 that correspond two different protocols 104 are grouped into the same subnetwork by the object 102 having the coordinator role 502. As shown, the top two objects 102 correspond to the protocol "A" 104, and the bottom two objects 102 correspond to the protocol "B" 104. The middle object 102 on the right corresponds to both the protocol "A" 104 and the protocol "B" 104 and includes a translation capability 504.

The objects 102 forming the subnetwork 402 may exchange wireless communications 302 with other objects directly or indirectly. For example, the top two objects 102 that each correspond to the protocol "A" 104 may directly exchange a wireless communication 302-1. As another example, the bottom two objects 102 that each correspond to the same protocol "B" 104 may nevertheless indirectly exchange a wireless communication 302 using the coordinator object 102 as an intermediary. More specifically, a wireless communication 302-4 may be sent from the bottom-most object 102 that corresponds to the protocol "B" 104 to the coordinator object 102, and the coordinator object 102 may send a wireless communication 302-3 to the other object 102 that corresponds to the protocol "B" 104. Because both of the wireless communications 302-3 and 302-4 correspond to the protocol "B" 104, the coordinator object 102 does not perform a translation 504.

In contrast, the coordinator object 102 does perform a translation 504 if either of the top two objects 102 that correspond to the protocol "A" 104 are to communicate with either of the bottom two objects 102 that correspond to the protocol "B" 104. A communication between the left upper object 102 and the left lower object 102 may be implemented as follows: The left upper object 102 transmits the wireless communication 302-2 to the coordinator object 102 in a manner that comports with the protocol "A" 104. The coordinator object 102 performs a translation 504 of the wireless communication from corresponding to the protocol "A" 104 to corresponding to the protocol "B" 104. The coordinator object 102 then transmits the wireless communication 302-3 to the left lower object 102 in a manner that comports with the protocol "B" 104.

Figure 7B:
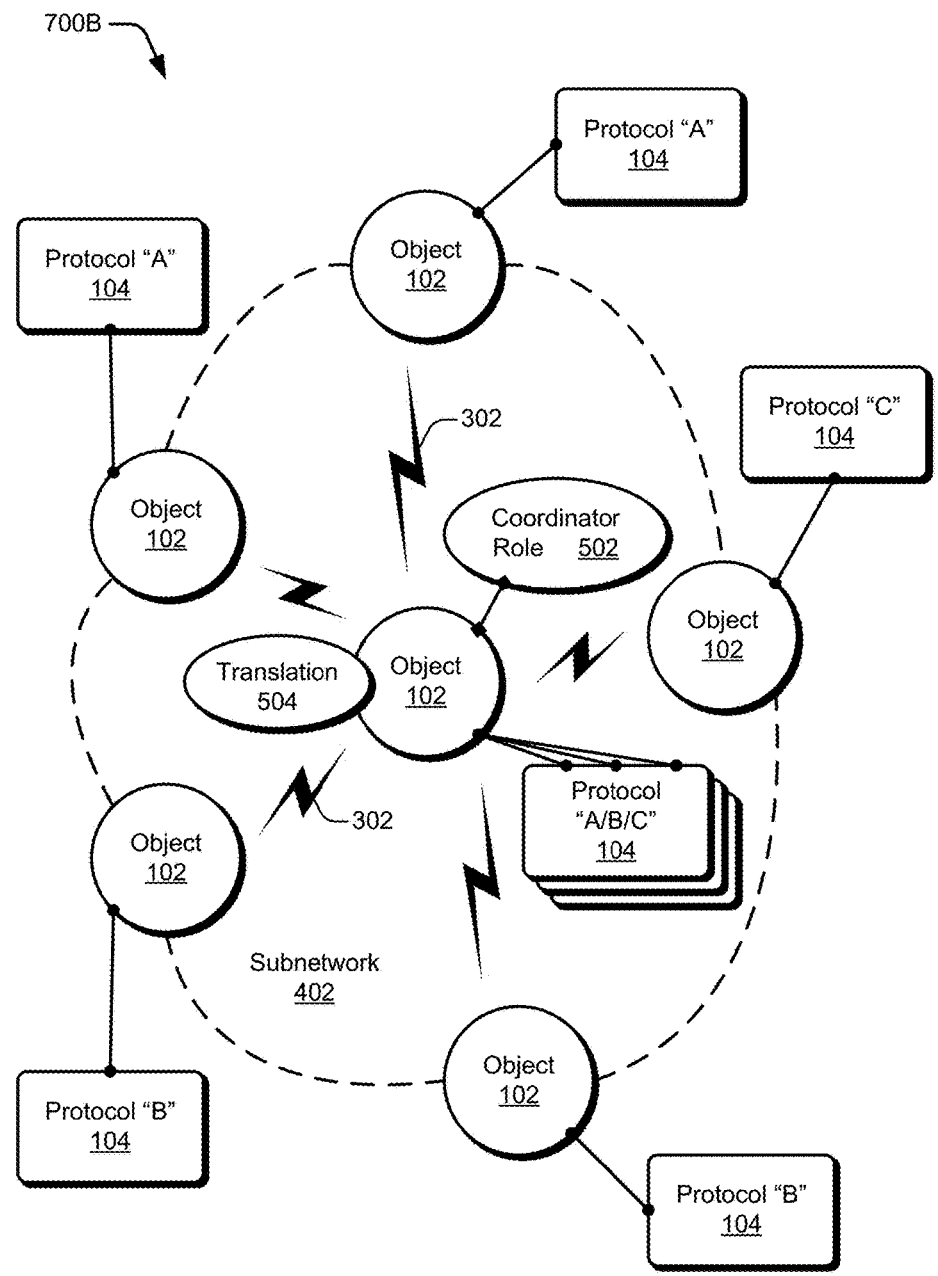
FIG. 7B illustrates another example scenario with a subnetwork including objects corresponding to different protocols.

FIG. 7B illustrates an example scenario 700B with a subnetwork 402 including objects 102 corresponding to different protocols 104. With the subnetwork 402 of the scenario 700B, objects 102 that correspond to three different protocols 104 are grouped into the same subnetwork by the object 102 having the coordinator role 502. As shown, the top two objects 102 correspond to the protocol "A" 104, the bottom two objects 102 correspond to the protocol "B" 104, and the right object 102 corresponds to the protocol "C" 104. The central or hub object 102 corresponds to the protocol "A" 104, the protocol "B" 104, and the protocol "C" 104. The hub object 102 also includes a translation capability 504 and has a coordinator role 502 for the subnetwork 402. Although not separately illustrated, a hub-architected subnetwork 402 like that shown in FIG. 7B may instead be implemented with objects 102 having a same protocol 104.

The objects 102 forming the subnetwork 402 may exchange wireless communications 302 with other objects at least indirectly via the hub object 102. For example, the bottom two objects 102 that each correspond to the same protocol "B" 104 nevertheless indirectly exchange a wireless communication 302 using the hub coordinator object 102 as an intermediary. In this case, the hub coordinator object 102 does not perform a translation 504. In contrast, the hub coordinator object 102 does perform a translation 504 if either of the top two objects 102 that correspond to the protocol "A" 104 are to communicate with either of the bottom two objects 102 that correspond to the protocol "B" 104 or with the right object 102 that corresponds to the protocol "C" 104. In this case, the hub coordinator object 102 performs a translation 504 of the wireless communication from corresponding to the protocol "A" 104 to corresponding to the protocol "B" 104 or to the protocol "C" 104.

Figure 9:
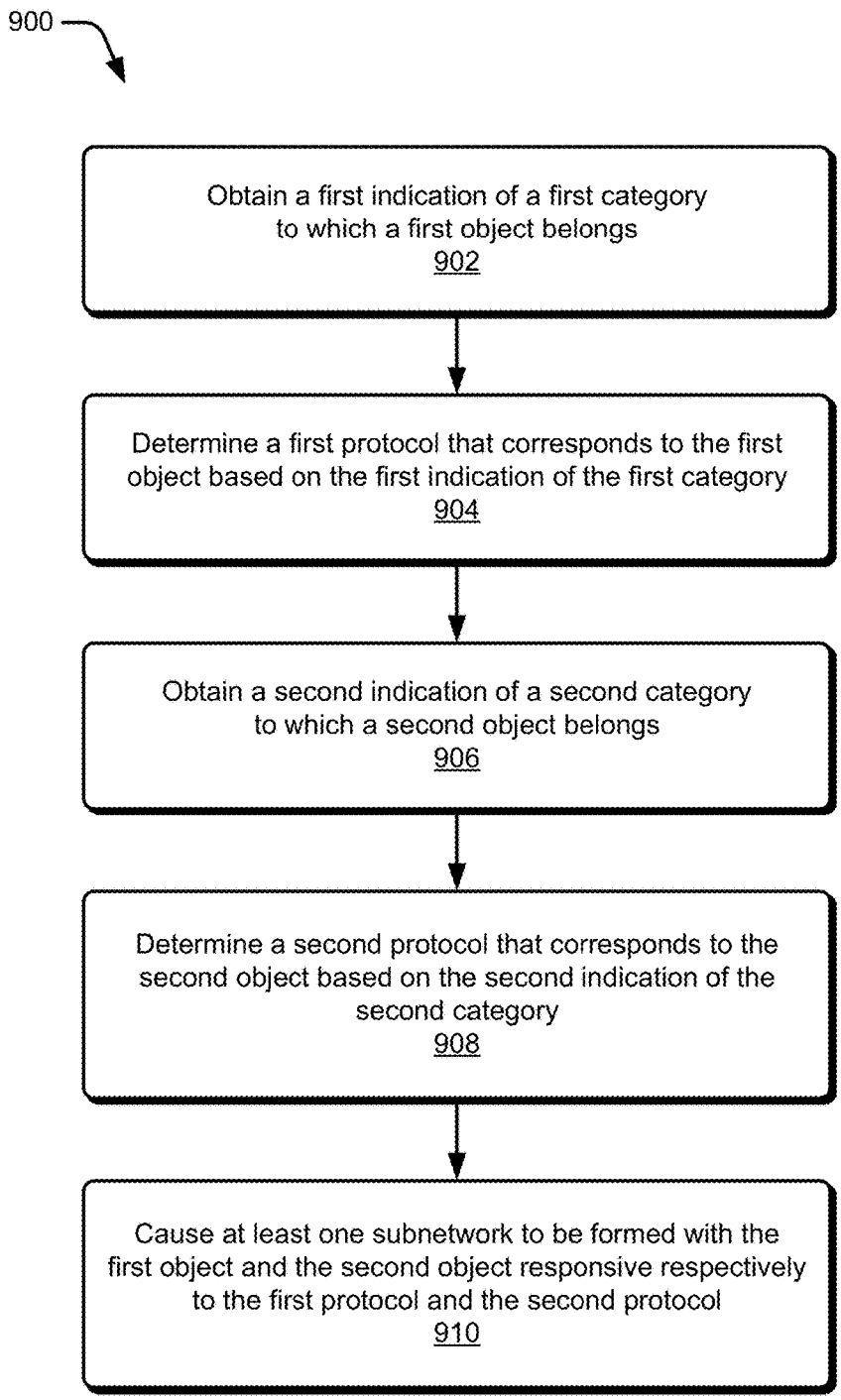
FIG. 9 is a flow diagram illustrating an example procedure in accordance with one or more example embodiments.
Figure 10:
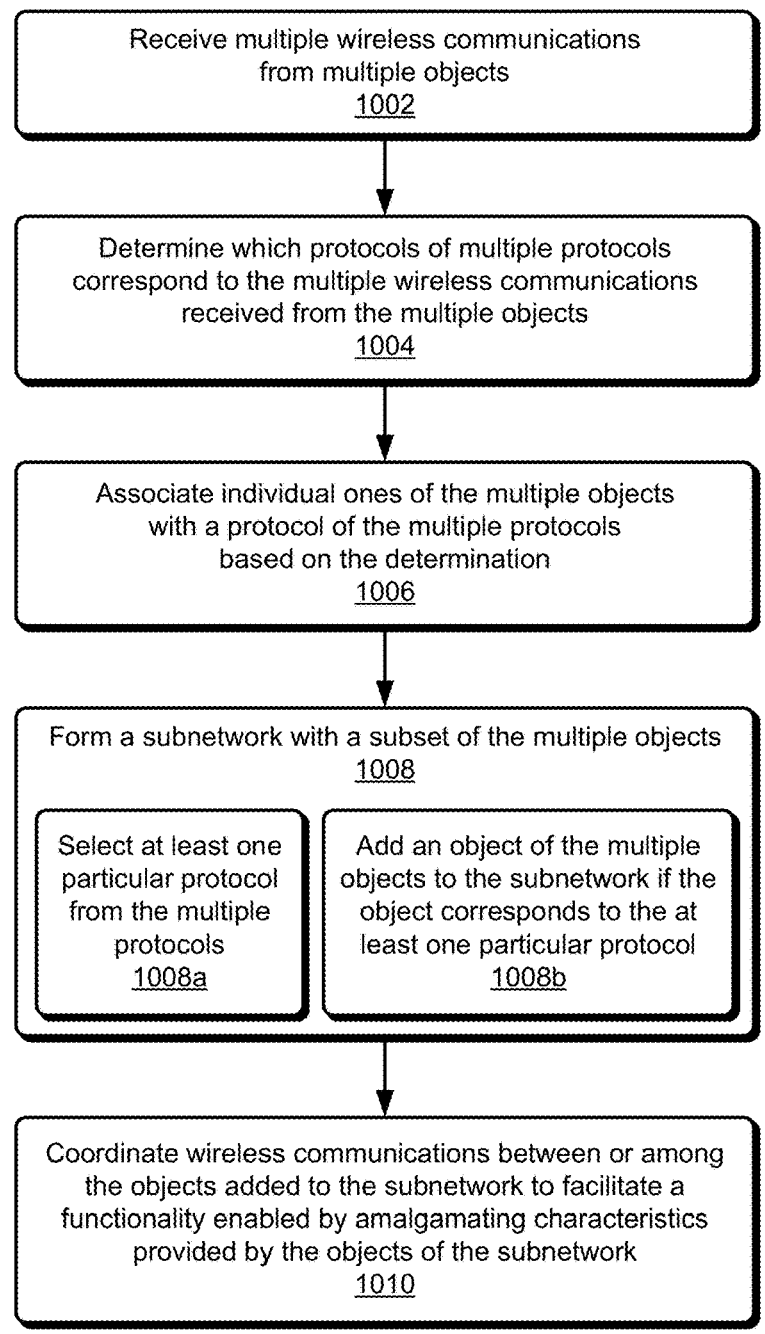
FIG. 10 is a flow diagram illustrating another example procedure in accordance with one or more example embodiments.
Figure 11:
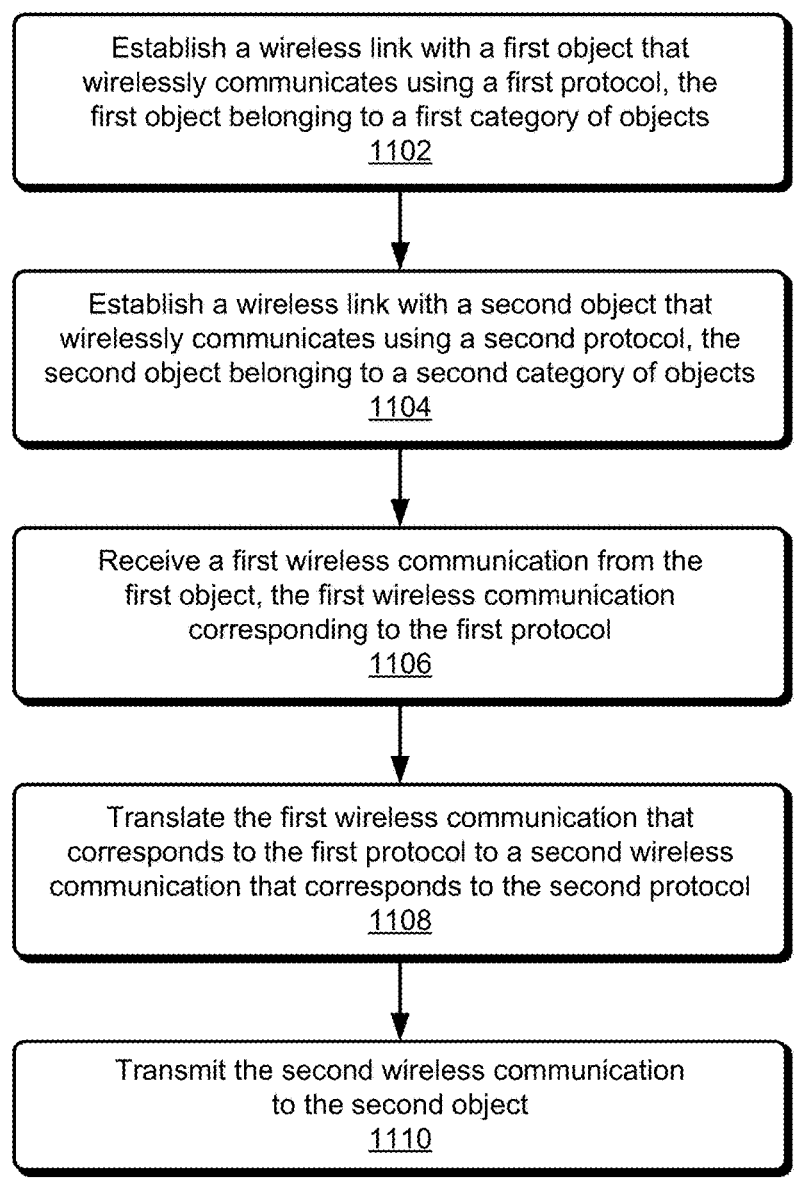
FIG. 11 is a flow diagram illustrating yet another example procedure in accordance with one or more example embodiments.

FIG. 8 illustrates an example object environment 800 in which one or more procedures, such as those illustrated in FIGS. 9-11, may be implemented. As illustrated, the object environment 800 includes two categories 202: a first category 202-1 and a second category 202-2. The first category 202-1 is associated with a first protocol 104-1, and the second category 202-2 is associated with a second protocol 104-2. A first object 102-1 belongs to the first category 202-1 and corresponds to the first protocol 104-1. A second object 102-2 belongs to the second category 202-2 and corresponds to the second protocol 104-2.

The object environment 800 further includes an object 102 and a subnetwork 402 that corresponds to a protocol 104. The subnetwork 402 may be implemented as an ad hoc network, an infrastructure network, a peer-to-peer network, a Wi-Fi network, a micro network, a Bluetooth-based network, a proprietary network, some combination thereof, and so forth. The object 102 includes an object coordination module 128. The object 102 exchanges a first wireless communication 302-1 with the first object 102-1 and a second wireless communication 302-2 with the second object 102-2. For instance, the object 102 may transmit the first wireless communication 302-1 to the first object 102-1 or may receive the first wireless communication 302-1 from the first object 102-1.

The first category 202-1 and the second category 202-2 may be respectively represented by a first indication 806-1 and a second indication 806-2 of the category. Examples of an indication 806 include a name or title, a version number, a code, a detectable formatting, a reference to a published specification, an example of a specification, a description, or some combination thereof. The first or second indication 806-1 or 806-2 may be determined by the object 102 via a reception of an advertising communication that is broadcast from another object, by analyzing a received wireless communication, or some combination thereof, and so forth.

In one or more example embodiments, the object coordination module 128 of the object 102 coordinates other objects to amalgamate objects into subnetworks or to amalgamate characteristics into combined characteristic entities. For example, the object coordination module 128 communicates with other objects to determine associated categories or corresponding protocols to facilitate grouping of the objects to form one or more subnetworks as described above. The object coordination module 128 may further coordinate communications between or among objects of the same subnetwork or different subnetworks, including by performing at least one translation for objects corresponding to different protocols.

The object coordination module 128 of the object 102 is capable of collecting characteristics received from other objects. A first characteristic 120-1 may be received from the first object 102-1, and a second characteristic 120-2 may be received from the second object 102-2. Collected characteristics 120 are amalgamated into a combined characteristic entity 808. The combined characteristic entity 808 may be implemented as at least part of a data structure, at least part of a database, an autonomous agent, part of a machine learning module, a portion of artificial intelligence (AI) functionality, some combination thereof, and so forth. The combined characteristic entity 808 is organized or constructed so as to enable multiple characteristics 120 from multiple different objects 102 to be analyzed jointly. For example, a conclusion may be drawn that is based on a set of sensed values that are collected from multiple different objects.

The object coordination module 128 analyzes the combined characteristic entity 808 and generates a report 804. The report 804 may be provided to an end-user. The analysis of the combined characteristic entity 808 may be performed with regard to a factor 810. The factor 810 may be obtained, for instance, from a cloud service such as a calendaring service. For a calendar example, an end user's schedule may be a factor 810 applied as guidance to formulate a recommendation type of a report 804, with the recommendation identifying a clothing ensemble for the end user to wear. The recommendation can identify clothing outfits that are both clean and style-appropriate for a day's scheduled activities. Alternatively, the factor 810 may be indicative of at least one preference established for the end user. For example, a preference for avoiding the wasting of food may be a factor 810 applied to focus (e.g., narrow or filter) a notice type of a report 804, with the notice listing options for meals that an end user may prepare. The notice can list recipe selections based on available food objects in order of ingredient expiration dates.

In one or more example embodiments, the object coordination module 128 of the object 102 may perform a translation 504. The object 102 receives the first wireless communication 302-1 from the first object 102-1, with the first wireless communication 302-1 corresponding to the first protocol 104-1. The object 102 performs a translation 504 to convert the first wireless communication 302-1 that corresponds to the first protocol 104-1 to a second wireless communication 302-2 that corresponds to the second protocol 104-2. The object 102 also transmits the second wireless communication 302-2 to the second object 102-2.

In this example, the first wireless communication 302-1 includes the first characteristic 120-1 that is associated with the first object 102-1. The second wireless communication 302-1 also includes the first characteristic 120-1, as converted by the translation 504. The second object 102-2 therefore receives the first characteristic 120-1 with the second wireless communication 302-2. The second object 102-2 uses an object coordination module 128 (not explicitly shown in FIG. 8) to analyze the first characteristic 120-1 in conjunction with the second characteristic 120-2, which is associated with the second object 102-2. Based on the analysis, the second object 102-2 generates a command 812. Examples of the command 812 include a command to transmit an update back to the first object 102-1, a command to request a different or updated characteristic from the first object 102-1, a command to ask the object 102 to communicate with the first object 102-1, a command to store or use a combined characteristic entity, a command to obtain an updated sensor value at the second object 102-2, a command to generate a report 804 for an end user 304, a command to establish a new or second subnetwork 402, a command to acquire a factor 810, a command to take some other action, or some combination thereof.

Although two objects 102-1 and 102-2 are illustrated in FIG. 8 and described above, the object 102 may alternatively coordinate more than two objects. Also, the object coordination module 128 is shown as being executable on the object 102. However, the object coordination module 128 may alternatively be executable on an end-user device 306 (of FIG. 3). Additionally, although communications between objects 102 are shown as wireless communications 302, at least some inter-object communications may instead be implemented using one or more wired connections.

Having discussed example details of systems and schemes for object amalgamation based on categorization and protocol granularization, consider now some example procedures to illustrate additional aspects of one or more techniques.

Example Procedures

This section describes example procedures for object amalgamation based on categorization and protocol granularization in one or more embodiments. Aspects of the procedures may be implemented in hardware, firmware, or software, or a combination thereof. The procedures are shown as a set of blocks that specify operations that may be performed by one or more devices, but the operations are not necessarily limited to the orders as shown for performing the operations by the respective blocks, for the operations may be performed in other orders or in fully or partially overlapping manners. In at least some embodiments, the procedures may be performed by a suitably configured device, such as an object 102 (e.g., of FIGS. 1 and 8) or an end-user device 306 (of FIG. 3), including one that implements an object coordination module 128 (e.g., of FIGS. 1 and 8).

FIG. 9 is a flow diagram 900 that includes five blocks 902-910 and that illustrates an example procedure in accordance with one or more example embodiments. At block 902, a first indication of a first category to which a first object belongs is obtained. For example, an object 102, such as an object coordination module 128 thereof, may obtain a first indication 806-1 of a first category 202-1 to which a first object 102-1 belongs. An indication 806 of a category may be obtained, for instance, by listening to advertisements broadcast by objects, by analyzing a transmission of an object, by receiving a message from an object in response to a transmitted category inquiry message, some combination thereof, and so forth.

At block 904, a first protocol that corresponds to the first object is determined based on the first indication of the first category. For example, the object 102 may determine a first protocol 104-1 that corresponds to the first object 102-1 based on the first indication 806-1 of the first category 202-1. To do so, the object 102 may consult an internal or local table that links a category indication to an associated protocol; may transmit a protocol request that includes the category indication to a remote server, which remote server returns at least an identification of the associated protocol; may analyze a received sample message to ascertain a pattern that matches a particular protocol; may forward a received sample message to a remote server for analysis, which remote server performs a pattern analysis and returns at least an identification of particular associated protocol; some combination thereof; and so forth.

At block 906, a second indication of a second category to which a second object belongs is obtained. For example, the object 102 may obtain a second indication 806-2 of a second category 202-2 to which a second object 102-2 belongs. At block 908, a second protocol that corresponds to the second object is determined based on the second indication of the second category. For example, the object 102 may determine a second protocol 104-2 that corresponds to the second object 102-2 based on the second indication 806-2 of the second category 202-2.

At block 910, at least one subnetwork is caused to be formed with the first object and the second object responsive respectively to the first protocol and the second protocol. For example, the object 102 may cause at least one subnetwork 402 to be formed with the first object 102-1 and the second object 102-2 responsive respectively to the first protocol 104-1 and the second protocol 104-2. To effectuate a formation of at least one subnetwork 402, the object 102 may form two subnetworks, such as a subnetwork "A" 402 and a subnetwork "B" 402 of the scenario 600 (of FIG. 6), and function as a common object 102 that holds at least one coordinator role 502*a* or 502*b* and that is capable of performing a protocol translation 504. Alternatively, the object 102 may form one subnetwork, such as a subnetwork 402 of the scenario 700A (of FIG. 7A) or the scenario 700B (of FIG. 7B), and may hold a coordinator role 502 and perform protocol translation 504. The object 102 may act as an intermediary object between the first object 102-1 and the second object 102-2. Moreover, the object 102 may identify other objects that are part of the at least one subnetwork or instruct the first object 102-1 and the second object 102-2 to communicate directly with those objects having a compatible protocol 104.

FIG. 10 is a flow diagram 1000 that includes five blocks 1002-1010 and that illustrates another example procedure in accordance with one or more example embodiments. At block 1002, multiple wireless communications are received from multiple objects. For example, an object 102, such as an object coordination module 128 thereof, may receive multiple wireless communications 302, such as first and second wireless communications 302-1 and 302-2, from multiple objects 102, such as first and second objects 102-1 and 102-2. To do so, the object 102 may use a wireless communication unit 118 of a networking unit 112.

At block 1004, which protocols of multiple protocols correspond to the multiple wireless communications received from the multiple objects is determined. For example, the object 102 may determine which protocols 104 of multiple protocols correspond to the multiple wireless communications 302 received from the multiple objects 102. To effectuate a protocol determination, the object 102 may obtain an indication 806 of a category 202 and ascertain a protocol 104 that is associated with the category 202. Alternatively, the object 102 may perform a pattern analysis on a sample received wireless communication 302 to ascertain a matching protocol 104.

At block 1006, individual ones of the multiple objects are associated with a protocol of the multiple protocols based on the determining. For example, the object 102 may associate individual ones of the multiple objects 102 with a protocol 104 of the multiple protocols based on the determination. To do so, the object 102 may link respective objects 102 with respective protocols 104 in a table or other data structure. Additionally or alternatively, the object 102 may communicate with respective objects 102 using the respective protocols 104.

At block 1008, a subnetwork is formed with a subset of the multiple objects. For example, the object 102 may form a subnetwork 402 with a subset of the multiple objects 102. The object 102 may, for instance, form a protocol-homogenous subnetwork 402, such as a subnetwork "A" 402 or a subnetwork "B" 402 as shown at 400 (of FIG. 4) or in the scenario 500 (of FIG. 5), or as is described for a single-protocol alternative for the hub-architected network 402 that is depicted in the scenario 700B (of FIG. 7B). Alternatively, the object 102 may form a protocol-heterogeneous subnetwork 402, such as the subnetwork 402 as shown in the scenario 700A (of FIG. 7A) or in the scenario 700B (of FIG. 7B).

At block 1008*a*, at least one particular protocol is selected from the multiple protocols. For example, the object 102 may select at least one particular protocol 104 from the multiple protocols. The object 102 may, for instance, select protocols for shoes and clothes but exclude protocols for food, cleaning products, and household appliances. At block 1008*b*, an object of the multiple objects is added to the subnetwork if the object corresponds to the at least one particular protocol. For example, the object 102 may add an object 102-1 of the multiple objects to the subnetwork 402 if the corresponding protocol 104-1 is selected for inclusion. If a protocol 104-2 is not a selected protocol, then the object 102-2 that corresponds to the non-selected protocol 104-2 is excluded from the subnetwork 402.

At block 1010, wireless communications between or among the objects added to the subnetwork are coordinated to facilitate a functionality enabled by amalgamating characteristics provided by the objects of the subnetwork. For example, the object 102 may coordinate wireless communications 302 between or among the objects added to the subnetwork 402 to facilitate a functionality enabled by amalgamating characteristics 120 provided by the objects of the subnetwork 402. A computing functionality may pertain to operations that are based on or utilize characteristics gathered from multiple different objects. To effectuate such coordination, the object 102 may instruct the objects of the subnetwork 402 to transmit one or more characteristics 120. The object 102, for instance, may collect the characteristics 120 to produce a combined characteristic entity 808 that is usable for generating a report 804 for an end user 304, with the report 804 based on characteristics 120 collected from multiple different objects.

FIG. 11 is a flow diagram 1100 that includes five blocks 1102-1110 and that illustrates yet another example procedure in accordance with one or more example embodiments. At block 1102, a wireless link is established with a first object that wirelessly communicates using a first protocol, with the first object belonging to a first category of objects. For example, an object 102, such as an object coordination module 128 thereof, may establish a wireless link with a first object 102-1 that wirelessly communicates using a first protocol 104-1, with the first object 102-1 belonging to a first category 202-1 of objects. To establish a wireless link, the object 102 may participate in an exchange of wireless communications 302 with another object in which the other object acknowledges receipt of a communication transmitted from the object 102.

At block 1104, a wireless link is established with a second object that wirelessly communicates using a second protocol, with the second object belonging to a second category of objects. For example, the object 102 may establish a wireless link with a second object 102-2 that wirelessly communicates using a second protocol 104-2, with the second object 102-2 belonging to a second category 202-2 of objects.

At block 1106, a first wireless communication is received from the first object, with the first wireless communication corresponding to the first protocol. For example, the object 102 may receive a first wireless communication 302-1 from the first object 102-1, with the first wireless communication 302-1 corresponding to the first protocol 104-1. The first protocol 104-1 may include, for instance, a wireless communication protocol 106 or a characteristic description protocol 108.

At block 1108, the first wireless communication that corresponds to the first protocol is translated to a second wireless communication that corresponds to the second protocol. For example, the object 102 may translate the first wireless communication 302-1 that corresponds to the first protocol 104-1 to a second wireless communication 302-2 that corresponds to the second protocol 104-2. To perform a translation 504, the object 102 may convert a formatting of one or more characteristics 120 in accordance with the characteristic description protocol 108, may change a frequency modulation or a timeslot in accordance with the wireless communication protocol 106, or some combination thereof, etc. to accommodate an updated protocol 104, to account for protocols of different categories 202 or different subcategories 204, and so forth.

At block 1110, the second wireless communication is transmitted to the second object. For example, the object 102 may transmit the second wireless communication 302-2 to the second object 102-2. To effectuate the transmission, the object 102 may transmit the second wireless communication 302-2 in accordance with the second protocol 104-2 using a wireless communication unit 118 via a subnetwork 402.

Having described example procedures in accordance with one or more embodiments, consider now an example system and device that can be utilized to implement the various techniques described herein.

Example Device and System

Figure 12:
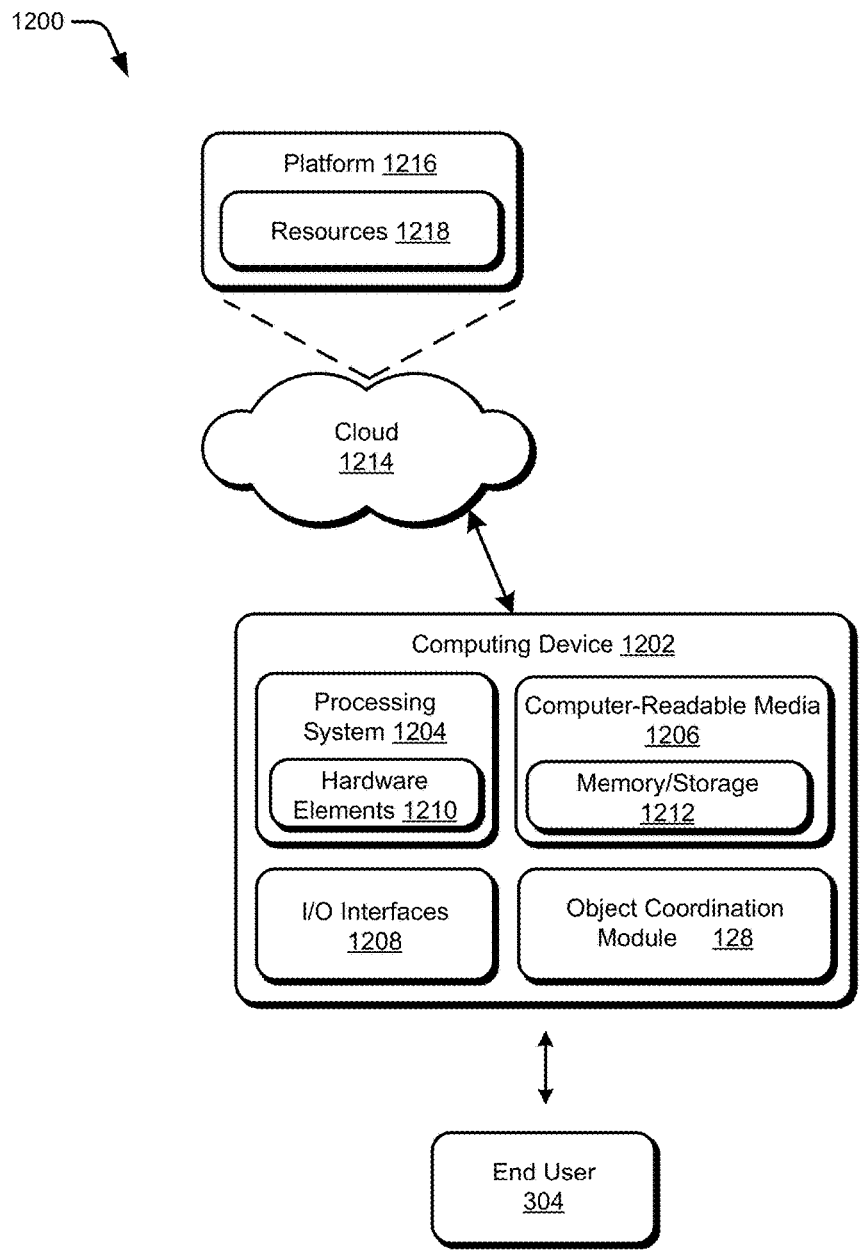
FIG. 12 illustrates an example system including various components of an example device that can be employed for one or more embodiments of object amalgamation based on categorization and protocol granularization as described herein.

FIG. 12 illustrates an example system generally at 1200 that includes an example computing device 1202 that is representative of one or more computing systems or computing devices that may implement the various techniques described herein. This is illustrated through inclusion of an object coordination module 128, which may operate as described herein above. A computing device 1202 may be implemented as, for example, an object 102, an end-user device 306, or a combined object and end-user device. Alternatively, although not explicitly shown in FIG. 12, a computing device 1202 may be implemented as, for example, an on-chip system or system-on-a-chip (SOC), or any other suitable computing device or computing system.

The example computing device 1202 as illustrated includes at least one processing system 1204, one or more computer-readable media 1206, and one or more I/O interfaces 1208 that may be communicatively coupled, one to another. Although not explicitly shown, the computing device 1202 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including one or more hardware elements 1210 that may be implemented as processors, functional blocks, and so forth. This may include implementation in hardware as an application specific integrated circuit (ASIC), a general-purpose processor, or other logic device formed using, e.g., one or more semiconductors. The hardware elements 1210 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (e.g., random access memory (RAM)) or nonvolatile media (e.g., read only memory (ROM), flash memory, optical discs, or magnetic disks). The memory/storage component 1212 may include fixed media (e.g., RAM, ROM, or a fixed hard drive) or removable media (e.g., a flash memory card, a removable hard drive, or an optical disc). The computer-readable media 1206 may be implemented in a variety of other ways as further described below.

Input/output interface(s) 1208 are representative of functionality to allow a user (e.g., an end user 304) to enter commands or information to computing device 1202 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors that are implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., an LCD or LED screen, a monitor, or a projector), a speaker, a printer, a network card, a haptic vibrating device, or a combination thereof. Thus, the computing device 1202 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1206 may include a variety of media that may be accessed by the computing device 1202. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, removable and non-removable media or storage devices implemented in a process or technology suitable for storage of information, such as computer readable instructions, data structures, program modules, logic elements/circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible media, article of manufacture, or combination thereof that is suitable to store desired information and that may be accessed by a computer.

"Computer-readable signal media," as used herein, refers to a signal-bearing medium that is implemented to transmit instructions to hardware of the computing device 1202, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal that has one or more of its characteristics set or changed in such a manner as to encode information in the signal. By way of example, but not limitation, computer-readable signal media may include wired media, such as a wired network or direct-wired connection, or wireless media, such as acoustic, RF, microwave, infrared, or other wireless media.

As previously described, hardware elements 1210 and computer-readable media 1206 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an application-specific integrated circuit (ASIC), a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1210. The computing device 1202 may be configured to implement particular instructions or functions corresponding to software or hardware modules. Accordingly, implementation of a module that is executable by the computing device 1202 as software may be achieved at least partially in hardware, e.g., through use of computer-readable storage media or the hardware elements 1210 of the processing system 1204. The instructions or functions may be executable/operable by one or more articles of manufacture (e.g., one or more computing devices 1202 or processing systems 1204) to implement techniques, modules, or examples described herein.

The techniques described herein may be supported by various configurations of the computing device 1202 and are not limited to the specific aspects of the example devices described herein. This functionality may also be implemented fully or partially through use of a distributed system, such as over a "cloud" 1214 via a platform 1216 as described below.

The cloud 1214 may include or represent a platform 1216 for resources 1218. The platform 1216 abstracts underlying functionality of hardware (e.g., one or more servers or at least one data center) and software resources of the cloud 1214. The resources 1218 may include applications or data that can be utilized while computer processing is at least partially executed on servers that are remote from, or distributed around, the computing device 1202. Resources 1218 may also include services provided over the Internet or through a subscriber network, such as a cellular or Wi-Fi network.

The platform 1216 may abstract resources and functions to connect the computing device 1202 with other computing devices or services. The platform 1216 may also serve to abstract a scaling of resources to provide a corresponding level of scale to encountered demand for the resources 1218 that are implemented via the platform 1216. Accordingly, in an interconnected device embodiment, implementation of functionality described herein may be distributed throughout the illustrated system of FIG. 12, or at least throughout the cloud 1214 along with the computing device 1202. For example, functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital environment in which Internet of Things (IOT) objects are configured to wirelessly communicate a diverse suite of characteristics by utilizing a protocol that is tailored for a particular IOT object category, a device implemented to amalgamate IOT objects into a subnetwork, the device comprising:
an object coordination module implemented at least partially in hardware, the object coordination module configured to perform operations comprising:
obtaining a first indication of a first category to which a first IOT object belongs;
determining a first protocol that corresponds to the first IOT object based on the first indication of the first category, the first protocol tailored to characteristics of the first category that are unique to the first category;
obtaining a second indication of a second category to which a second IOT object belongs;
determining a second protocol that corresponds to the second IOT object based on the second indication of the second category, the second protocol tailored to characteristics of the second category that are unique to the second category; and
causing at least one subnetwork to be formed with the first IOT object and the second IOT object responsive respectively to the determining the first protocol and the determining the second protocol, the at least one subnetwork facilitating inter-object communication across the first protocol and the second protocol.

2. The device as described in claim 1, wherein:
the at least one subnetwork comprises a first subnetwork and a second subnetwork;
the causing comprises:
causing the first subnetwork to be formed including the first IOT object; and
causing the second subnetwork to be formed including the second IOT object; and
the object coordination module is configured to perform operations further comprising acting as a common object that links the first subnetwork and the second subnetwork.

3. The device as described in claim 1, wherein:
the causing comprises causing one subnetwork to be formed that includes the first IOT object and the second IOT object; and
the object coordination module is configured to perform operations further comprising performing translations of wireless communications exchanged between the first IOT object and the second IOT object.

4. The device as described in claim 1, wherein the object coordination module is configured to perform operations further comprising:
receiving a first characteristic from the first IOT object in accordance with the first protocol;
interpreting the first characteristic using the first protocol to produce a first interpreted characteristic;
receiving a second characteristic from the second IOT object in accordance with the second protocol;
interpreting the second characteristic using the second protocol to produce a second interpreted characteristic; and
amalgamating the first interpreted characteristic and the second interpreted characteristic into a combined characteristic entity that enables multiple characteristics to be jointly analyzed.

5. The device as described in claim 4, wherein the combined characteristic entity comprises at least one data structure that is usable by a computing device to generate a report that is responsive to both the first interpreted characteristic and the second interpreted characteristic.

6. In a digital environment in which Internet of Things (IOT) objects are configured to wirelessly communicate a diverse suite of characteristics by utilizing a protocol that is tailored for a particular IOT object category, an apparatus implemented to amalgamate IOT objects into a subnetwork, the apparatus comprising:
at least one networking unit implemented at least partially in hardware, the at least one networking unit configured to perform operations comprising:
receiving multiple wireless communications from multiple IOT objects;
determining which protocols of multiple protocols correspond to the multiple wireless communications received from the multiple IOT objects, the multiple protocols tailored to characteristics of different IOT object categories that respectively include at least one of the multiple IOT objects, the characteristics being unique to the respective IOT object categories;
associating individual ones of the multiple IOT objects with a protocol of the multiple protocols based on the determining;
forming a subnetwork with a subset of the multiple IOT objects, the forming including:
selecting at least one particular protocol from the multiple protocols; and
adding an IOT object of the multiple IOT objects to the subnetwork if the IOT object corresponds to the at least one particular protocol; and
coordinating wireless communications between the IOT objects added to the subnetwork to facilitate a functionality enabled by amalgamating the characteristics provided by the IOT objects of the subnetwork.

7. The apparatus as described in claim 6, wherein:
each wireless communication of the multiple wireless communications includes a protocol indicator; and
the determining comprises identifying the protocol corresponding to each wireless communication using the protocol indicator.

8. The apparatus as described in claim 6, wherein:
each wireless communication of the multiple wireless communications is formatted in accordance with a given protocol; and
the determining comprises recognizing the given protocol corresponding to each wireless communication based on how the wireless communication is formatted.

9. The apparatus as described in claim 6, wherein the at least one particular protocol comprises a first protocol and a second protocol; and wherein the coordinating comprises:
performing a translation of a wireless communication from a wireless communication that corresponds to the first protocol to a wireless communication that corresponds to the second protocol.

10. The apparatus as described in claim 6, wherein the coordinating comprises:
receiving wireless communications from the IOT objects of the subnetwork, each of the wireless communications including a characteristic associated with the IOT object that transmitted the wireless communication;
amalgamating the characteristics received from the IOT objects of the subnetwork into a combined characteristic entity;

analyzing the combined characteristic entity with regard to a factor; and generating a report for an end user based on the analyzing.

11. The apparatus as described in claim 10, wherein:
the at least one networking unit is configured to perform operations further comprising obtaining the factor from a cloud service;
the report comprises a recommendation for the end user; and
the generating comprises generating the recommendation for the end user as guided by the factor obtained from the cloud service.

12. The apparatus as described in claim 10, wherein:
the at least one networking unit is configured to perform operations further comprising obtaining the factor from one or more preferences established for the end user;
the report comprises a notice for the end user; and
the generating comprises providing the notice to the end user as focused by the factor obtained from the one or more preferences established for the end user.

13. In a digital environment in which Internet of Things (IOT) objects are configured to wirelessly communicate a diverse suite of characteristics by utilizing a protocol that is tailored for a particular IOT object category, a method implemented to amalgamate IOT object functionality by coordinating communication of IOT object characteristics, the method comprising:
establishing a wireless link with a first IOT object that wirelessly communicates using a first protocol, the first IOT object belonging to a first category of IOT objects, the first protocol tailored to characteristics of the first category of IOT objects that are unique to the first category of IOT objects;
establishing a wireless link with a second IOT object that wirelessly communicates using a second protocol, the second IOT object belonging to a second category of IOT objects, the second protocol tailored to characteristics of the second category of IOT objects that are unique to the second category of IOT objects;
receiving a first wireless communication from the first IOT object, the first wireless communication corresponding to the first protocol;
translating the first wireless communication that corresponds to the first protocol to a second wireless communication that corresponds to the second protocol; and
transmitting the second wireless communication to the second IOT object.

14. The method as described in claim 13, further comprising:
forming a first subnetwork with the first IOT object using the first protocol; and
forming a second subnetwork with the second IOT object using the second protocol.

15. The method as described in claim 13, further comprising:
forming a subnetwork using the first protocol and the second protocol, the subnetwork including the first IOT object and the second IOT object.

16. The method as described in claim 13, further comprising:
determining the first protocol based on the first category of IOT objects.

17. The method as described in claim 16, wherein the determining comprises:
receiving an indication of the first category of IOT objects from the first IOT object; and
identifying the first protocol responsive to the indication of the first category of IOT objects received from the first IOT object.

18. The method as described in claim 16, wherein the determining comprises:
retrieving a specification of at least part of the first protocol using an indication of the first category of IOT objects via the internet.

19. The method as described in claim 13, further comprising:
receiving, by the second IOT object, the second wireless communication, the second wireless communication including a first characteristic associated with the first IOT object;
analyzing, by the second IOT object, the first characteristic in conjunction with a second characteristic that is associated with the second IOT object; and
generating, by the second IOT object, a command based on the analyzing.

20. The method as described in claim 13, wherein the translating comprises:
converting one or more characteristics that are formatted in accordance with a first characteristic description protocol into one or more characteristics that are formatted in accordance with a second characteristic description protocol.

* * * * *